United States Patent
Takemura

(10) Patent No.: US 9,854,133 B2
(45) Date of Patent: Dec. 26, 2017

(54) TEST CHART USED FOR CALIBRATION IN IMAGE FORMING APPARATUS

(71) Applicant: CANON KABUSHIKI KAISHA, Tokyo (JP)

(72) Inventor: Taichi Takemura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/171,666

(22) Filed: Feb. 3, 2014

(65) Prior Publication Data

US 2014/0233049 A1 Aug. 21, 2014

(30) Foreign Application Priority Data

Feb. 20, 2013 (JP) ................................. 2013-031427

(51) Int. Cl.
*G06K 15/02* (2006.01)
*H04N 1/60* (2006.01)
*H04N 1/00* (2006.01)

(52) U.S. Cl.
CPC ............. *H04N 1/60* (2013.01); *H04N 1/0005* (2013.01); *H04N 1/00045* (2013.01); *H04N 1/6044* (2013.01)

(58) Field of Classification Search
USPC ........ 358/1.1, 1.9, 1.12, 400, 401, 406, 500, 358/501, 504, 518
See application file for complete search history.

(56) References Cited

U.S. PATENT DOCUMENTS

| | | | |
|---|---|---|---|
| 7,111,784 B2* | 9/2006 | Nakayama | G01J 1/32 235/462.04 |
| 7,773,895 B2 | 8/2010 | Zaima | |
| 7,813,659 B2 | 10/2010 | Kawaguchi | 399/39 |
| 7,952,774 B2* | 5/2011 | Ikeda | 358/518 |
| 8,508,800 B2* | 8/2013 | Abe | 358/1.9 |
| 8,594,517 B2 | 11/2013 | Usui et al. | 399/15 |
| 9,267,841 B2 | 2/2016 | Ebihara et al. | G01J 3/0291 |
| 2005/0105112 A1* | 5/2005 | Fukuda | 358/1.9 |
| 2005/0207740 A1 | 9/2005 | Fukushima | |
| 2007/0230978 A1 | 10/2007 | Zaima | |

(Continued)

FOREIGN PATENT DOCUMENTS

| | | |
|---|---|---|
| EP | 1 892 583 A2 | 2/2008 |
| JP | H06-152872 A | 5/1994 |
| JP | H10-322555 A | 12/1998 |

(Continued)

OTHER PUBLICATIONS

U.S. Appl. No. 14/170,411, filed Jan. 31, 2014 by Taichi Takemura.

(Continued)

*Primary Examiner* — Thomas D Lee
(74) *Attorney, Agent, or Firm* — Fitzpatrick, Cella, Harper & Scinto

(57) ABSTRACT

Multiple measurement images are formed in a test chart. Reflected light from the test patterns is received by light receiving elements of a color sensor for an accumulation time that is determined for the respective test patterns. The lengths of the test patterns in the conveyance direction of the test chart are determined according to the lengths of the accumulation times for the respective test patterns.

18 Claims, 17 Drawing Sheets

(56) References Cited

U.S. PATENT DOCUMENTS

2008/0225307 A1 9/2008 Murayama et al.
2012/0008154 A1 1/2012 Abe

FOREIGN PATENT DOCUMENTS

| JP | 2001-092195 A | 4/2001 |
| JP | 2002-258546 A | 9/2002 |
| JP | 2004-245931 | 9/2004 |
| JP | 2005-274771 | 10/2005 |
| JP | 2007-274438 A | 10/2007 |
| JP | 2009-004865 A | 1/2009 |
| JP | 2009-163223 | 7/2009 |
| JP | 2011-186087 | 9/2011 |
| JP | 2013-007610 | 1/2013 |

OTHER PUBLICATIONS

European Office Action dated Feb. 5, 2015 from counterpart European Patent Application No. 14155991.4.
Chinese Office Action dated Jan. 5, 2016 for counterpart Chinese Patent Application No. 201410057372.8.

\* cited by examiner

FIG. 4

| NUMBER | C | M | Y | K | ACCUMULATION SETTING |
|---|---|---|---|---|---|
| 1 | 0 | 0 | 0 | 0 | 1 |
| 2 | 50 | 0 | 0 | 0 | 1 |
| 3 | 100 | 0 | 0 | 0 | 1 |
| 4 | 0 | 50 | 0 | 0 | 1 |
| 5 | 50 | 50 | 0 | 0 | 1 |
| 6 | 100 | 50 | 0 | 0 | 1 |
| 7 | 0 | 100 | 0 | 0 | 1 |
| 8 | 50 | 100 | 0 | 0 | 1 |
| 9 | 100 | 100 | 0 | 0 | 1 |
| 10 | 0 | 0 | 50 | 0 | 1 |
| 11 | 50 | 0 | 50 | 0 | 1 |
| 12 | 100 | 0 | 50 | 0 | 1 |
| 13 | 0 | 0 | 100 | 0 | 1 |
| 14 | 50 | 0 | 100 | 0 | 1 |
| 15 | 100 | 0 | 100 | 0 | 1 |
| 16 | 0 | 50 | 50 | 0 | 1 |
| 17 | 50 | 50 | 50 | 0 | 1 |
| 18 | 100 | 50 | 50 | 0 | 1 |
| 19 | 0 | 50 | 100 | 0 | 1 |
| 20 | 50 | 50 | 100 | 0 | 1 |
| 21 | 100 | 50 | 100 | 0 | 1 |
| 22 | 0 | 100 | 50 | 0 | 1 |
| 23 | 50 | 100 | 50 | 0 | 1 |
| 24 | 100 | 100 | 50 | 0 | 1 |
| 25 | 0 | 100 | 100 | 0 | 1 |
| 26 | 50 | 100 | 100 | 0 | 1 |
| 27 | 100 | 100 | 100 | 0 | 2 |
| 28 | 0 | 0 | 0 | 50 | 1 |
| 29 | 50 | 0 | 0 | 50 | 1 |
| 30 | 100 | 0 | 0 | 50 | 2 |
| 31 | 0 | 50 | 0 | 50 | 1 |
| 32 | 50 | 50 | 0 | 50 | 1 |
| 33 | 100 | 50 | 0 | 50 | 2 |
| 34 | 0 | 100 | 0 | 50 | 1 |
| 35 | 50 | 100 | 0 | 50 | 2 |
| 36 | 100 | 100 | 0 | 50 | 2 |
| 37 | 0 | 0 | 50 | 50 | 1 |
| 38 | 50 | 0 | 50 | 50 | 1 |
| 39 | 100 | 0 | 50 | 50 | 2 |
| 40 | 0 | 0 | 100 | 50 | 1 |
| 41 | 50 | 0 | 100 | 50 | 1 |
| 42 | 100 | 0 | 100 | 50 | 2 |
| 43 | 0 | 50 | 50 | 50 | 1 |
| 44 | 50 | 50 | 50 | 50 | 2 |
| 45 | 100 | 50 | 50 | 50 | 2 |
| 46 | 0 | 50 | 100 | 50 | 1 |
| 47 | 50 | 50 | 100 | 50 | 2 |
| 48 | 100 | 50 | 100 | 50 | 2 |
| 49 | 0 | 100 | 50 | 50 | 1 |
| 50 | 50 | 100 | 50 | 50 | 2 |
| 51 | 100 | 100 | 50 | 50 | 2 |
| 52 | 0 | 100 | 100 | 50 | 1 |
| 53 | 50 | 100 | 100 | 50 | 2 |
| 54 | 100 | 100 | 100 | 50 | 3 |
| 55 | 0 | 0 | 0 | 100 | 2 |
| 56 | 50 | 0 | 0 | 100 | 2 |
| 57 | 100 | 0 | 0 | 100 | 3 |
| 58 | 0 | 50 | 0 | 100 | 2 |
| 59 | 50 | 50 | 0 | 100 | 2 |
| 60 | 100 | 50 | 0 | 100 | 3 |
| 61 | 0 | 100 | 0 | 100 | 2 |
| 62 | 50 | 100 | 0 | 100 | 2 |
| 63 | 100 | 100 | 0 | 100 | 3 |
| 64 | 0 | 0 | 50 | 100 | 2 |
| 65 | 50 | 0 | 50 | 100 | 2 |
| 66 | 100 | 0 | 50 | 100 | 3 |
| 67 | 0 | 0 | 100 | 100 | 2 |
| 68 | 50 | 0 | 100 | 100 | 2 |
| 69 | 100 | 0 | 100 | 100 | 3 |
| 70 | 0 | 50 | 50 | 100 | 2 |
| 71 | 50 | 50 | 50 | 100 | 3 |
| 72 | 100 | 50 | 50 | 100 | 3 |
| 73 | 0 | 50 | 100 | 100 | 2 |
| 74 | 50 | 50 | 100 | 100 | 3 |
| 75 | 100 | 50 | 100 | 100 | 3 |
| 76 | 0 | 100 | 50 | 100 | 2 |
| 77 | 50 | 100 | 50 | 100 | 3 |
| 78 | 100 | 100 | 50 | 100 | 3 |
| 79 | 0 | 100 | 100 | 100 | 2 |
| 80 | 50 | 100 | 100 | 100 | 3 |
| 81 | 100 | 100 | 100 | 100 | 3 |

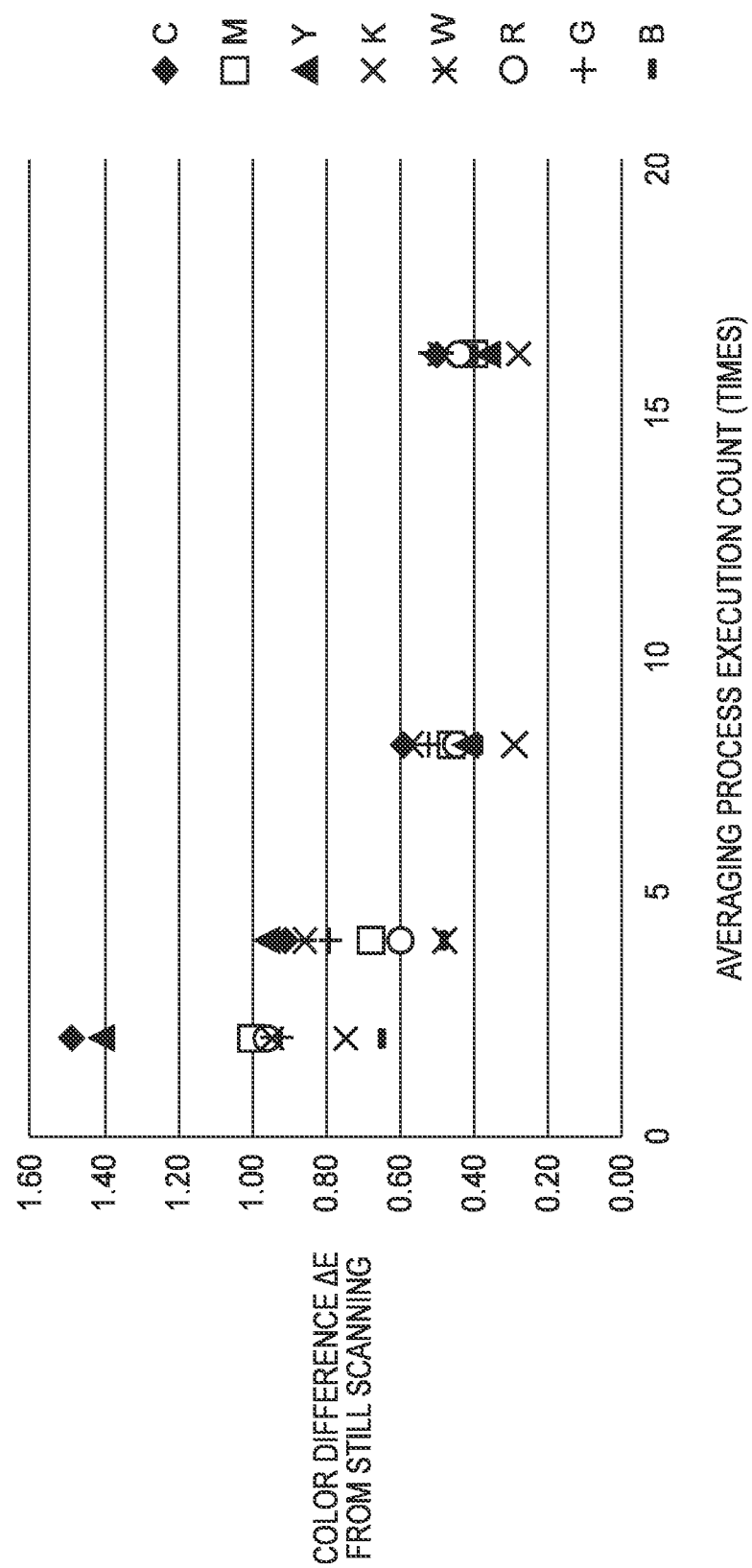

FIG. 7

| ACCUMULATION SETTING | ACCUMULATION TIME (ms) | AVERAGING PROCESS EXECUTION COUNT (TIMES) | SIZE (mm) |
|---|---|---|---|
| 1 | 3 | 16 | 12 |
| 2 | 6 | 16 | 24 |
| 3 | 12 | 16 | 48 |

FIG. 13

| NUMBER | C | M | Y | K | ACCUMULATION SETTING |
|---|---|---|---|---|---|
| 1 | 0 | 0 | 0 | 0 | 1 |
| 2 | 50 | 0 | 0 | 0 | 1 |
| 3 | 100 | 0 | 0 | 0 | 1 |
| 4 | 0 | 50 | 0 | 0 | 1 |
| 5 | 50 | 50 | 0 | 0 | 1 |
| 6 | 100 | 50 | 0 | 0 | 1 |
| 7 | 0 | 100 | 0 | 0 | 1 |
| 8 | 50 | 100 | 0 | 0 | 1 |
| 9 | 100 | 100 | 0 | 0 | 2 |
| 10 | 0 | 0 | 50 | 0 | 1 |
| 11 | 50 | 0 | 50 | 0 | 1 |
| 12 | 100 | 0 | 50 | 0 | 1 |
| 13 | 0 | 0 | 100 | 0 | 1 |
| 14 | 50 | 0 | 100 | 0 | 1 |
| 15 | 100 | 0 | 100 | 0 | 1 |
| 16 | 0 | 50 | 50 | 0 | 1 |
| 17 | 50 | 50 | 50 | 0 | 1 |
| 18 | 100 | 50 | 50 | 0 | 2 |
| 19 | 0 | 50 | 100 | 0 | 1 |
| 20 | 50 | 50 | 100 | 0 | 1 |
| 21 | 100 | 50 | 100 | 0 | 2 |
| 22 | 0 | 100 | 50 | 0 | 1 |
| 23 | 50 | 100 | 50 | 0 | 1 |
| 24 | 100 | 100 | 50 | 0 | 2 |
| 25 | 0 | 100 | 100 | 0 | 1 |
| 26 | 50 | 100 | 100 | 0 | 1 |
| 27 | 100 | 100 | 100 | 0 | 2 |
| 28 | 0 | 0 | 0 | 50 | 1 |
| 29 | 50 | 0 | 0 | 50 | 2 |
| 30 | 100 | 0 | 0 | 50 | 2 |
| 31 | 0 | 50 | 0 | 50 | 2 |
| 32 | 50 | 50 | 0 | 50 | 2 |
| 33 | 100 | 50 | 0 | 50 | 2 |
| 34 | 0 | 100 | 0 | 50 | 2 |
| 35 | 50 | 100 | 0 | 50 | 2 |
| 36 | 100 | 100 | 0 | 50 | 2 |
| 37 | 0 | 0 | 50 | 50 | 2 |
| 38 | 50 | 0 | 50 | 50 | 2 |
| 39 | 100 | 0 | 50 | 50 | 2 |
| 40 | 0 | 0 | 100 | 50 | 2 |
| 41 | 50 | 0 | 100 | 50 | 2 |
| 42 | 100 | 0 | 100 | 50 | 2 |
| 43 | 0 | 50 | 50 | 50 | 2 |
| 44 | 50 | 50 | 50 | 50 | 2 |
| 45 | 100 | 50 | 50 | 50 | 2 |
| 46 | 0 | 50 | 100 | 50 | 2 |
| 47 | 50 | 50 | 100 | 50 | 2 |
| 48 | 100 | 50 | 100 | 50 | 2 |
| 49 | 0 | 100 | 50 | 50 | 2 |
| 50 | 50 | 100 | 50 | 50 | 2 |
| 51 | 100 | 100 | 50 | 50 | 2 |
| 52 | 0 | 100 | 100 | 50 | 2 |
| 53 | 50 | 100 | 100 | 50 | 2 |
| 54 | 100 | 100 | 100 | 50 | 2 |
| 55 | 0 | 0 | 0 | 100 | 2 |
| 56 | 50 | 0 | 0 | 100 | 3 |
| 57 | 100 | 0 | 0 | 100 | 3 |
| 58 | 0 | 50 | 0 | 100 | 2 |
| 59 | 50 | 50 | 0 | 100 | 3 |
| 60 | 100 | 50 | 0 | 100 | 3 |
| 61 | 0 | 100 | 0 | 100 | 2 |
| 62 | 50 | 100 | 0 | 100 | 3 |
| 63 | 100 | 100 | 0 | 100 | 3 |
| 64 | 0 | 0 | 50 | 100 | 2 |
| 65 | 50 | 0 | 50 | 100 | 3 |
| 66 | 100 | 0 | 50 | 100 | 3 |
| 67 | 0 | 0 | 100 | 100 | 2 |
| 68 | 50 | 0 | 100 | 100 | 3 |
| 69 | 100 | 0 | 100 | 100 | 3 |
| 70 | 0 | 50 | 50 | 100 | 2 |
| 71 | 50 | 50 | 50 | 100 | 3 |
| 72 | 100 | 50 | 50 | 100 | 3 |
| 73 | 0 | 50 | 100 | 100 | 2 |
| 74 | 50 | 50 | 100 | 100 | 3 |
| 75 | 100 | 50 | 100 | 100 | 3 |
| 76 | 0 | 100 | 50 | 100 | 3 |
| 77 | 50 | 100 | 50 | 100 | 3 |
| 78 | 100 | 100 | 50 | 100 | 3 |
| 79 | 0 | 100 | 100 | 100 | 3 |
| 80 | 50 | 100 | 100 | 100 | 3 |
| 81 | 100 | 100 | 100 | 100 | 3 |

FIG. 17

| PATTERN TYPE | ACCUMULATION SETTING | ACCUMULATION TIME (ms) | AVERAGING PROCESS EXECUTION COUNT (TIMES) | COLOR MEASUREMENT REGION SIZE (mm) | PATTERN SIZE (mm) |
|---|---|---|---|---|---|
| A-1 | 1 | 3 | 16 | 12 | 14 |
| A-2 | 1 | 3 | 16 | 12 | 16 |
| B-1 | 2 | 6 | 16 | 24 | 26 |
| B-2 | 2 | 6 | 16 | 24 | 28 |
| C | 3 | 12 | 16 | 48 | 52 | ies # TEST CHART USED FOR CALIBRATION IN IMAGE FORMING APPARATUS

BACKGROUND OF THE INVENTION

Field of the Invention

The present invention relates to an image forming apparatus capable of executing calibration for maintaining color stability, and a test chart for calibration.

Description of the Related Art

In order to maintain color stability in an image forming apparatus, it is necessary to scan a measurement image (test pattern) and adjust various image processing conditions, image forming conditions, and the like. This adjustment process is referred to as "calibration". The test pattern is scanned by a color separation type color sensor, and the appropriate exposure time differs for each color. If there is a large amount of incident light coming from the measurement subject, the exposure time needs to be shortened, and if there is a small amount of incident light, the exposure time needs to be lengthened. Japanese Patent Laid-Open No. 2007-274438 proposes a technique in which the accumulation time of light receiving elements in the color sensor is changed according to the color and density of the formed image pattern. Accordingly, it is possible to detect the color and density of the image pattern with sufficient accuracy for any color and density of an image pattern.

The sheet (test chart) on which the test patterns have been recorded is conveyed at a fixed speed. Accordingly, the length in the conveyance direction of a pattern having a long accumulation time may be longer, and the length in the conveyance direction of a pattern having a short accumulation time may be shorter. However, the length in the conveyance direction of every test pattern is conventionally a fixed length that is determined using the test pattern with the longest accumulation time as a reference. Additionally, many types of patterns are needed in order to perform calibration with a high degree of accuracy. Accordingly, the number of sheets that are needed tends to increase. Also, regarding patterns having a short accumulation time, toner has been consumed excessively in order to form patterns due to their superfluous size.

SUMMARY OF THE INVENTION

In view of this, the present invention proposes an image forming apparatus and a test chart that enable reduction of pattern size, and reduction of the number of sheets and the amount of color materials consumed.

The image forming apparatus may comprises the following elements. An image forming unit is configured to create a test chart including a plurality of measurement images by forming a plurality of measurement images on a sheet. A conveying unit is configured to convey the test chart. A measuring unit is configured to measure the plurality of measurement images that are formed on the test chart conveyed by the conveying unit. The measuring unit comprises a light receiving element for receiving reflected light from the plurality of measurement images for accumulation times of the reflected light that are defined for the respective measurement images. The image forming unit is further configured to form the measurement images of which lengths in the conveyance direction of the test chart correspond to the defined accumulation times for the respective measurement images.

The test chart for calibration of an image forming apparatus may comprise a plurality of measurement images formed on a sheet. The measurement images are arranged so that the lengths of the measurement images in the conveyance direction of the test chart are proportional to accumulation times defined for the respective measurement images, and wherein the defined accumulation times are accumulation times of a light receiving element of an image forming apparatus for accumulating reflected light from the plurality of measurement images of the test chart.

Further features of the present invention will become apparent from the following description of embodiments with reference to the attached drawings.

BRIEF DESCRIPTION OF THE DRAWINGS

FIG. 4 is a table showing an example of image signal values for generating a test pattern.

FIG. 6 is a diagram showing a color difference with respect to an averaging process execution count.

FIG. 7 is a table showing a relationship between accumulation settings and test pattern size.

FIG. 13 is a diagram showing an example of basic accumulation settings.

FIG. 17 is a diagram showing an example of parameters for each pattern type.

DESCRIPTION OF THE EMBODIMENTS

The first described embodiment relates to a test chart for calibration for adjusting an image forming apparatus. Calibration is a process for performing maximum density and tone correction and creating a color matching profile, for example. Multiple measurement images (test patterns) are formed in a test chart using one or more color materials. Reflected light from each of the test patterns is accumulated by light receiving elements of a color sensor for an accumulation time that is determined for each test pattern. The accumulation time is determined for each test pattern in order to suppress saturation in the output of the color sensor while sufficiently ensuring the dynamic range of the color sensor for each test pattern. In particular, in the present embodiment, the lengths of the test patterns in the conveyance direction of the test chart corresponds to the lengths of the accumulation times for the respective test patterns. Accordingly, the pattern size can be reduced more than with the conventional technology since the size of needless regions that are not read by the color sensor can be reduced. As a result, the number of sheets and the amount of color materials that are consumed can be reduced.

Image Forming Apparatus

An image forming apparatus 100 according to an embodiment will be described with reference to FIG. 1. In the present embodiment, an electrophotographic type of method will be employed as an example of the image forming method. However, embodiments of the present invention can be applied to an inkjet type or a sublimation type of method. Note that an image forming means for forming an image on a sheet by discharging ink and a fixing means (drying means) for drying ink are used in an inkjet type of method.

Figure 1:
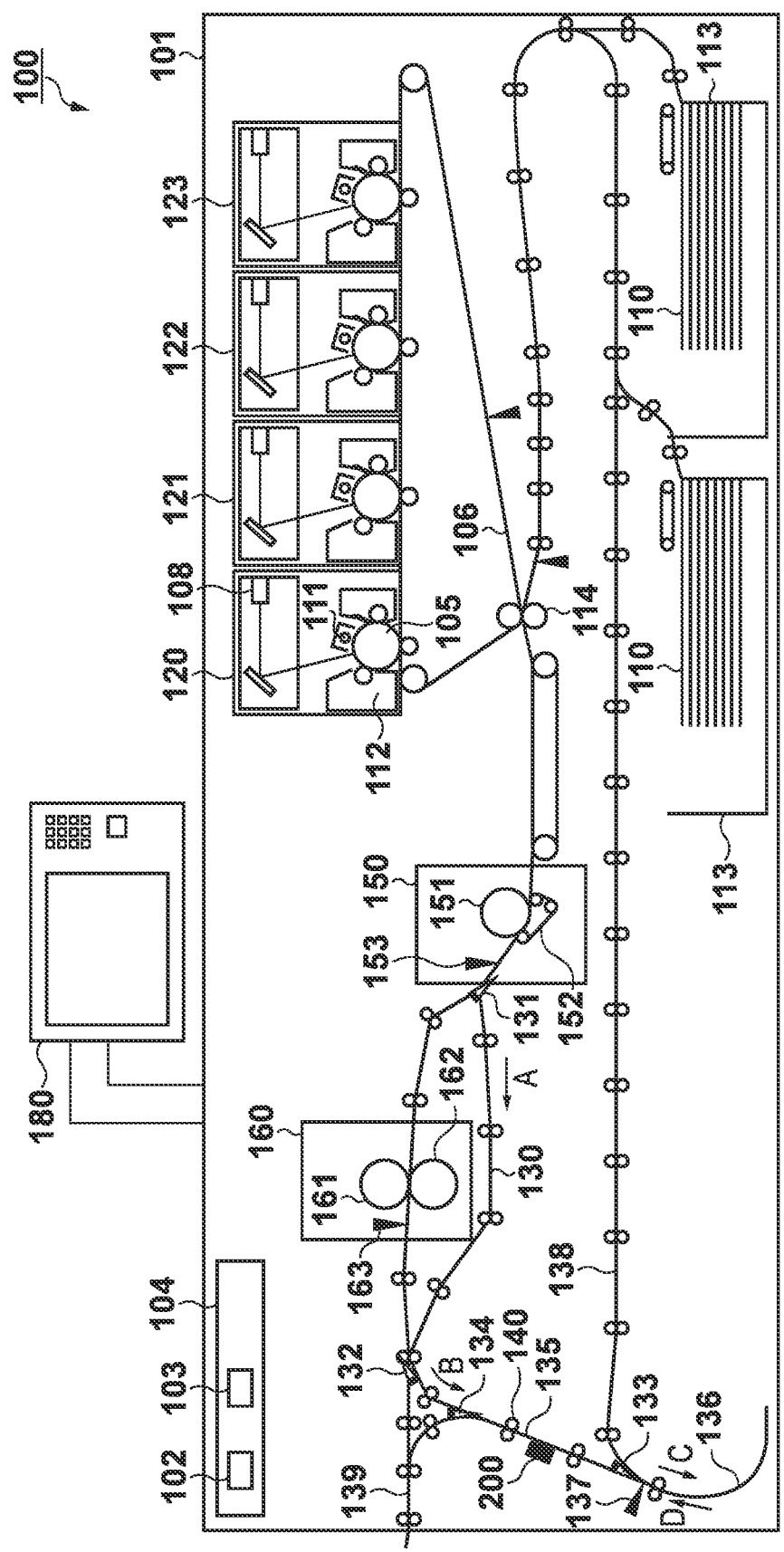
FIG. 1 is a schematic configuration diagram of an image forming apparatus.

FIG. 1 is a cross-sectional diagram showing the structure of the image forming apparatus 100. The image forming apparatus 100 includes a housing 101. Mechanisms for configuring a printer unit (image forming engine), and a control board storing unit 104 are provided in the housing 101. The control board storing unit 104 stores an engine control unit 102 that performs control related to printing procedure processes (e.g., sheet feeding process) performed by the mechanisms, and a printer controller 103 that performs image processing and the like.

As shown in FIG. 1, four stations 120, 121, 122, and 123 corresponding to Y, M, C, and K are provided. The stations 120, 121, 122, and 123 are image forming units that transfer toner to a sheet to form an image. In particular, the stations 120, 121, 122, and 123 function as image forming means for creating a test chart for calibration for adjusting the image forming apparatus 100 by forming multiple test patterns on a sheet using one or more color materials. Note that YMCK is an abbreviation for yellow, magenta, cyan, and black. The stations are configured by substantially the same parts. A photoreceptor drum 105 is a type of image carrying member that is charged to a uniform surface potential by a primary charger 111. A latent image is formed on the photoreceptor drum 105 by laser light output from a laser 108. A developer 112 forms a toner image by developing the latent image using color materials (toner). The toner image (visible image) undergoes primary transfer onto an intermediate transfer member 106. The visible image that is formed on the intermediate transfer member 106 undergoes secondary transfer by a transfer roller 114 onto a sheet 110 conveyed from a storage tray 113.

The fixing process mechanism of the present embodiment has a first fixer 150 and a second fixer 160 that apply heat and pressure to the toner image that has been transferred to the sheet 110, thereby fixing it to the sheet 110. The first fixer 150 includes a fixing roller 151 for applying heat to the sheet 110, a pressure belt 152 for causing the sheet 110 to press against the fixing roller 151, and a post-first-fixing sensor 153 that detects that the fixing is complete. The fixing roller 151 is a hollow roller that has a heater inside. Also, the rollers are driven by a motor (not shown), and thereby convey the sheet 110. The second fixer 160 is disposed further downstream in the conveyance direction of the sheet 110 than the first fixer 150. The second fixer 160 adds a gloss to the toner image on the sheet 110 that was fixed by the first fixer 150 and ensures fixedness. The second fixer 160 also has a fixing roller 161, a pressure roller 162, and a post-second-fixing sensor 163, similarly to the first fixer 150. Depending on the type of the sheet 110, it is not necessary to pass through the second fixer 160. In such a case, in order to reduce the amount of energy consumed, the sheet 110 passes through the conveyance path 130 without going through the second fixer 160. A conveyance path switching flapper 131 functions as a switching means for switching between guiding the sheet 110 to the conveyance path 130 and guiding the sheet 110 to the second fixer 160.

A conveyance path switching flapper 132 is a guiding member that guides the sheet 110 to a discharging route 135 or to a discharging route 139 for discharge to the outside. A reversal sensor 137 is provided on the discharging route 135. The leading edge of the sheet 110 passes the reversal sensor 137 and is conveyed to a reversal unit 136. When the reversal sensor 137 detects the trailing edge of the sheet 110, the conveyance direction of the sheet 110 is switched. In other words, it switches from the conveyance direction indicated by arrow C to the conveyance direction indicated by arrow D. A conveyance path switching flapper 133 is a guiding member that guides the sheet 110 to a conveyance path 138 for double-sided image formation, or to the discharging route 135. A conveyance path switching flapper 134 is a guiding member that guides the sheet 110 to the discharging route 139 for discharge to the outside. Note that multiple conveyance rollers 140 are provided on the conveyance paths such as the discharging route 135 and the discharging route 139.

A color sensor 200 that detects the pattern image on the sheet 110 is disposed further downstream in the conveyance direction of the sheet 110 than the second fixer 160. The color sensor 200 functions as a color measuring unit that measures the color of an image fixed to a sheet further downstream in the conveyance direction of the sheet than the first fixer 150 and the second fixer 160. The color sensor 200 may be disposed on the discharging route 139, the conveyance path 138, or the conveyance path 130. When calibration is instructed from an operation panel 180, the engine control unit 102 executes calibration such as maximum density correction, tone correction, and multicolor adjustment (ICC profile creation).

In the present embodiment, the sheet on which the test patterns have been formed is conveyed from the conveyance path 130 to the discharging route 135 and pre-scanned by the color sensor 200. After pre-scanning is complete, the sheet is conveyed to the reversal unit 136. Here, the sheet feeding direction of the sheet is reversed. The sheet is conveyed in the opposite direction on the discharging route 135, is once again conveyed to the color sensor 200, and main scanning is executed. Note that after pre-scanning is complete, the sheet may be conveyed via another route and guided to the color sensor 200. For example, in order to form an image on both sides, namely a first side and a second side of a sheet, it is possible to use the conveyance path 138, which is a conveyance path for conveying a sheet on which an image has been formed on the first side. The conveyance sequence in this case is as follows: reversal unit 136=>conveyance path 138=>conveyance path 130=>discharging route 135=>reversal unit 136=>conveyance path 138=>conveyance path 130=>discharging route 135. In this case, the sheet passes through the conveyance path 138 twice and passes the color sensor 200 a total of three times. This is because when it passes the color sensor 200 the first time, the first side on which the test pattern has been formed faces the color sensor 200, and when it passes the color sensor 200 the second time, the second side faces the color sensor 200. When the sheet passes the color sensor 200 the third time, main scanning is executed since the first side once again faces the color sensor 200. Note that it is important that the sheet on which the test pattern has been formed passes the color sensor 200 two times or more, and thereby prescanning is executed in the first passing time, and main scanning is executed in the second passing time. Because of this, the sheet may be conveyed on any type of conveyance path as long as the sheet passes the color sensor 200 two times or more.

In this way, the conveyance rollers 140 function as conveying means for conveying a sheet (test chart) on which multiple measurement images (test patterns) have been formed. The color sensor 200 functions as a measuring means for measuring (pre-scanning, main-scanning, etc.) multiple test patterns from a sheet being conveyed by the conveyance rollers 140.

Color Sensor

The structure of a color separation type of color sensor 200 and a color measurement operation will be described next with reference to FIG. 2. Note that the color sensor is not limited to the description here, as long as it is capable of changing the accumulation time, which is a feature of the present embodiment. The accumulation time is an amount of time for which the color sensor 200 accumulates reflected light from the test pattern in a light receiving element.

Figure 2:
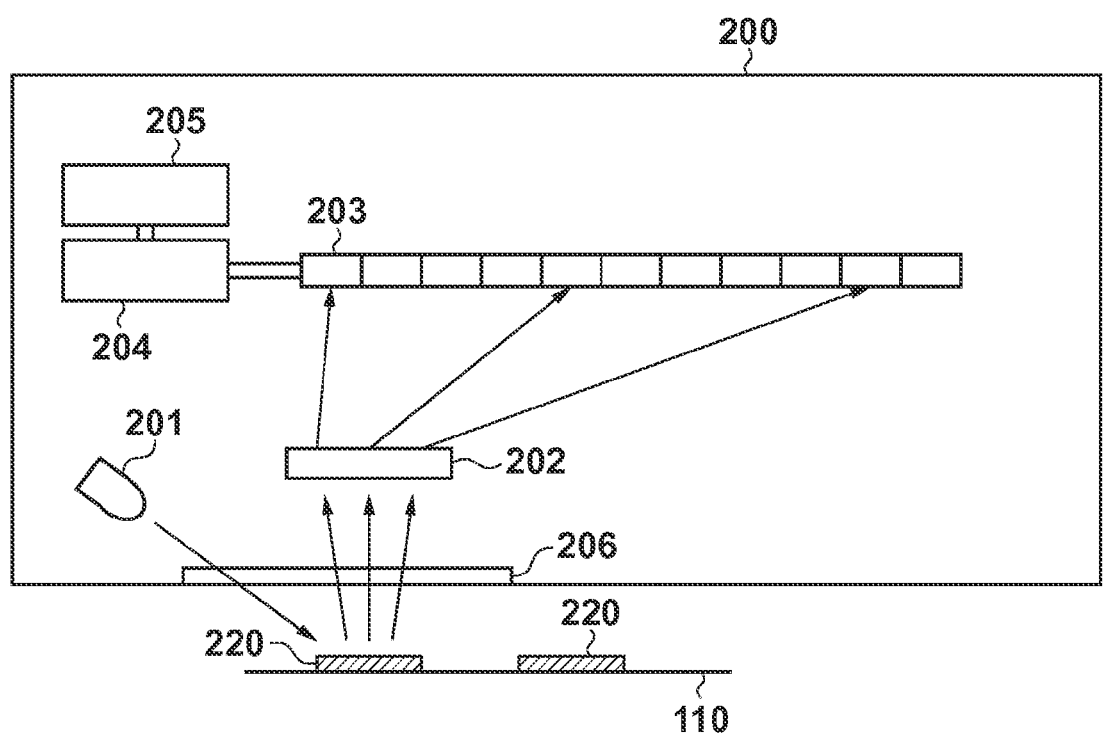
FIG. 2 is a schematic configuration diagram of a color sensor.

FIG. 2 is a diagram showing the structure of the color sensor 200. A white LED 201 is a light emitting element that irradiates the test pattern 220 on the sheet 110 with light. A diffraction grating 202 is a color separation component that separates light that is reflected from the test pattern 220 and passes through a window 206 according to the wavelength. A line sensor 203 is a light detecting element including n light receiving elements that detect light decomposed by the diffraction grating 202 for each wavelength. The line sensor 203 receives reflected light from the test pattern and accumulated a charge corresponding to the amount of received reflected light for an accumulation time that is in accordance with an instruction from a host controller, and outputs an output signal corresponding to the amount of reflected light. Note that the accumulation time is designated by the host controller for each test pattern. A calculation unit 204 performs various types of calculations based on light intensity values of pixels detected by the line sensor 203. A memory 205 stores various types of data to be used by the calculation unit 204. The calculation unit 204 has a color separation calculation unit that performs a color separation calculation based on the light intensity values, a Lab calculation unit that calculates Lab values, and the like. Note that the calculation unit 204 may sample an amount of reflected light a certain number of times (averaging process execution count) for each test pattern and calculate an average value. The averaging process is effective for mitigating the influence of density irregularities and the like in the test pattern. It is also possible to furthermore provide a lens that gathers light emitted from the white LED 201 in the test pattern 220 on the sheet 110 and gathers light reflected from the test pattern 220 on the diffraction grating 202. Note that the color sensor 200 measures the color of the test pattern 220 conveyed by a conveyance unit (conveyance rollers 140) that conveys a sheet. Note that if multiple color sensors 200 are installed as color measurers, a configuration is possible in which only one calculation unit 204 and memory 205 are provided for the multiple color sensors 200. This is because according to this, processes relating to color measurement values from the multiple color sensors 200 can be executed in an integrated manner and the load on the printer controller 103 can be reduced. Also, since the number of components can be reduced, it is possible to obtain an effect of reducing manufacturing cost.

Description of Various Operations

The image forming apparatus 100 has at least a normal image forming mode and a calibration mode. The normal image forming mode is a mode in which an image is formed on a sheet according to a print job input from a host computer 301, and an image of an original that was scanned by an image scanner is formed on a sheet. The calibration mode is a mode in which color reproduction and tone attributes of the image forming apparatus 100 are maintained in a desired state. Maximum density correction, tone correction, color matching profile creation, and the like are executed in the calibration mode.

Color Conversion Process

Figure 3:
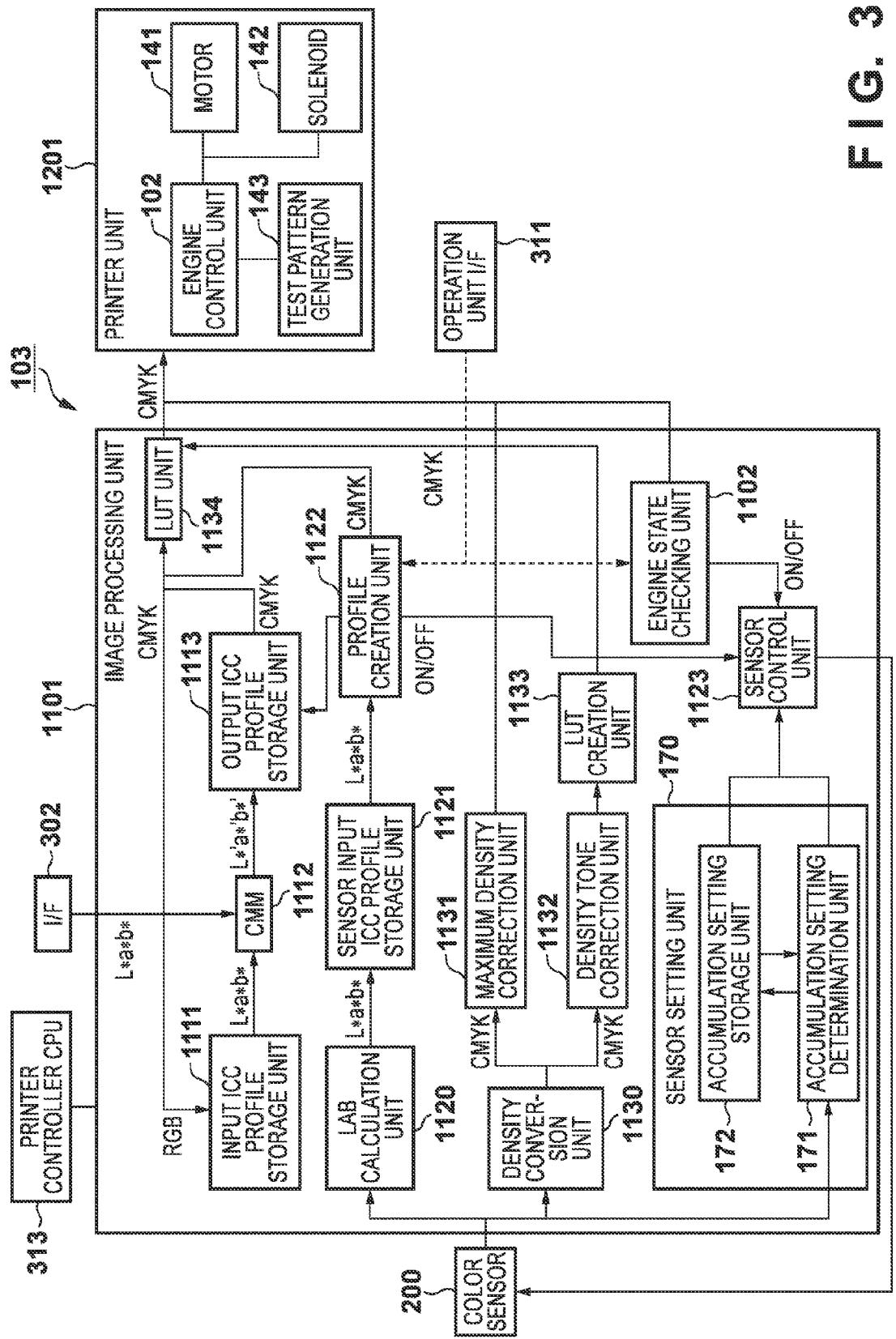
FIG. 3 is a schematic configuration diagram of a control unit.

A color conversion process will be described below with reference to FIG. 3. When a color image is to be formed, an I/F 302 receives input of RGB image signal values from a host computer, the operation panel 180, an external memory, or the like. Note that an image signal envisioning a standard printing CMYK image signal such as Japan Color may be input. An input ICC profile storage unit 1111 for external input executes RGB->L*a*b* conversion or CMYK->L*a*b* conversion with respect to image signals input through the I/F 302. The input ICC profile storage unit 1111 executes color conversion using an input ICC profile. The input ICC profile is a one-dimensional LUT (Look-Up Table) that controls the gamma of input image signals, a multicolor LUT that is referred to as "direct mapping", a one-dimensional LUT that controls the gamma of generated conversion data, and the like. According to these tables, the input image signal is converted from a device-dependent color space into device-independent L*a*b* data. The image signal that was converted in the L*a*b* table color system is input into a CMM (color management module) 1112. The CMM 1112 executes GAMUT conversion, light source type mismatch (also known as color temperature setting mismatch) color conversion, and the like with respect to the input image signal. In GAMUT conversion, mismatches between the scanning color space of an external I/F functioning as an input device and the output color reproduction range of the image forming apparatus 100 functioning as an output device are mapped. Light source type mismatch color conversion is color conversion for adjusting a mismatch between the light source type at the time of input and the light source type at the time of observing the output material. According to this, L*a*b* data is converted into L*'a*'b*' data. The L*'a*'b*' data is input into an output ICC output profile storage unit 1113 and is subjected to color conversion according to an output ICC profile stored therein. Accordingly, it is converted into an output device-dependent CMYK (Cyan Magenta Yellow Black) signal and is output to an LUT unit 1134. The LUT unit 1134 corrects the tone of the CMYK signal values using the LUT created by an LUT creation unit 1133 and outputs the resulting signal to the printer unit 1201. The engine control unit 102 of the printer unit 1201 controls the exposure units (lasers 108) of the four stations 120, 121, 122, and 123, and causes a latent image to be formed on the photoreceptor drum 105. The engine control unit 102 forms a toner image on a sheet and causes it to be discharged to the exterior while controlling a motor 141 that causes the conveyance rollers 140 to rotate, and controlling a solenoid 142 in order to switch conveyance paths.

Calibration Mode

A calibration execution instruction from the operation panel 180 is input to an engine state checking unit 1102 through an operation unit I/F 311. Note that the input data from the operation panel 180 may first be input to a printer controller CPU 313. Functions of the engine state checking unit 1102 may be realized by the printer controller CPU 313. When a transition to the calibration mode is instructed by the printer controller CPU 313, the engine state checking unit 1102 instructs the printer unit 1201 to output the test chart and instructs a sensor control unit 1123 to perform color measurement. The test chart is the sheet on which test patterns have been formed. The engine control unit 102 causes test pattern image data to be output to a test pattern generation unit 143 in accordance with the calibration instruction. The test pattern generation unit 143 may be installed in the image processing unit 1101. The test pattern generation unit 143 creates an image signal such that the lengths of the test patterns in the conveyance direction of the test chart correspond to the lengths of the accumulation times for the respective test patterns and outputs it to the engine control unit 102. The accumulation times for the respective test patterns may be stored in a memory inside of the test pattern generation unit 143, or they may be stored in an accumulation setting storage unit 172.

In the calibration mode, the color sensor 200 executes pre-scanning and main scanning. Pre-scanning is a process for scanning test patterns in order to adjust the accumulation times (also referred to as the scanning times, exposure times, or measurement times) for the respective test patterns (respective colors) in the color sensor 200. Main scanning is a process for scanning test patterns using the accumulation times determined through the pre-scanning, for maximum density correction, tone correction, or profile creation. In pre-scanning, an accumulation setting determination unit 171 in the sensor setting unit 170 determines the accumulation time for each test pattern based on the test pattern scanning results (spectral reflectance and amount of reflected light) obtained by the color sensor 200. Note that accumulation times determined in advance at the time of factory shipping or the like are used as the accumulation times for the respective test patterns in pre-scanning. The accumulation setting storage unit 172 stores the main scanning accumulation times that were determined for the test patterns. The accumulation times for pre-scanning may also be stored in the accumulation setting storage unit 172. The sensor control unit 1123 reads out the accumulation times corresponding to the test patterns when main scanning is to be executed and controls the accumulation times of the color sensor 200. The accumulation time may be a numeric value, or it may be a symbol indicating multiple levels such as accumulation setting 1, 2, or 3. Image processing conditions and image forming conditions are adjusted based on the scanning result (spectral reflectance) of the color sensor 200 acquired by the main scanning.

In this way, in the calibration mode, test patterns are formed on a sheet based on an image signal generated by the test pattern generation unit 143, the test patterns are scanned by the color sensor 200, and the image processing conditions and image forming conditions are adjusted. A maximum density correction unit 1131 corrects the maximum density based on CMYK signal values (density values) obtained by a density conversion unit 1130 furthermore converting the scanning result (spectral reflectance) of the color sensor 200. A charging potential, a developing potential, an exposure amount, and the like are examples of parameters for correcting the maximum density. A density/tone correction unit 1132 calculates a correction amount for exposure settings according to which a desired tonality is obtained, based on the CMYK signal values (density values) of the test patterns. The LUT creation unit 1133 creates an LUT in accordance with the correction amount of the exposure setting. Also, the scanning result (spectral reflectance) of the color sensor 200 is converted into Lab values by the Lab calculation unit 1120, converted using the profile stored in an input ICC profile storage unit 1121 for the color sensor, and input to a profile creation unit 1122. The profile creation unit 1122 performs characterization (multicolor CAL) for creating a profile, which is a multicolor LUT for suppressing multicolor variation. It is envisioned that an ICC (International Color Consortium) profile that has been accepted in the marketplace in recent years is used here as the profile for realizing superior color reproduction. The present invention can be applied to a color matching profile other than an ICC profile as well. Examples of this include a CRD employed from PostScript Level 2 or a color separation table in Photoshop (registered trademark) provided by Adobe, Inc., or a CMYK simulation in ColorWise by EFI, Inc. that preserves blackboard information. CRD is an abbreviation for Color Rendering Dictionary. The profile creation unit 1122 may create the profile in accordance with the method disclosed in Japanese Patent Laid-Open No. 2009-004865, for example. Maximum density correction, tone correction, and profile creation will not be described in detail here since it is possible to use a technique that is already publicly known.

Example of Test Pattern

FIG. 4 is a diagram showing an example of YMCK signals for generating test patterns included in a test chart. YMCK signals for 81 types of test patterns are shown in FIG. 4, but the number of test patterns may be changed according to the application of the test chart. For example, there are 928 test patterns in an ISO 12642 test form (test chart).

Size of Test Pattern

The sizes (lengths in the conveyance direction) of test patterns are determined with consideration given to the accumulation time, the conveyance speed, and the averaging process execution count. For example, the size of a test pattern is calculated according to an equation such as that shown below.

$$S = PS \times t \times N \qquad \text{Equation 1}$$

Here, PS is the conveyance speed (mm/s) of the sheet on which the test pattern is formed. t is the accumulation time (s) that is needed to obtain an appropriate amount of reflected light from the test pattern that is incident on the color sensor 200 in the test patterns. N is the number of times color measurement needs to be performed in order to average out the irregularities of microscopic regions in the test patterns. In the present embodiment, PS is presumed to be 250 mm/s for the sake of convenience in the description. The accumulation time t and the averaging process execution count N are different for each test pattern. The size of the test pattern may be determined at the time of factory shipping, or the test pattern generation unit 143 may determine the lengths of the test patterns dynamically. In this way, the test pattern generation unit 143 functions as a determining means for determining the length of each test pattern based on the accumulation time t for that test pattern, and the conveyance speed PS of the test chart. As shown in Equation 1, the test pattern generation unit 143 may calculate the length of each test pattern based on the accumulation time t for that test pattern, the conveyance speed PS of the test chart, and furthermore based on the number of times sampling is performed for the test pattern (averaging process execution count N).

Accumulation Setting

According to the table shown in FIG. 4, accumulation settings to be applied by the color sensor 200 are also registered for each of the 81 test patterns. The accumulation setting is a setting related to the time for which the color sensor 200 measures reflected light from the test pattern (may also be referred to as the accumulation time, measurement time, or exposure time). According to FIG. 4, one of multiple (e.g. three) accumulation setting levels is allocated to each test pattern. The amount of time for measuring a test pattern one time in the respective accumulation settings is, for example, as follows.

Accumulation setting 1: 3 ms
Accumulation setting 2: 6 ms
Accumulation setting 3: 12 ms A method for determining the accumulation setting for the test patterns will be described here. Test patterns having a high density (dark portions) and test patterns having a low density (light portions) in FIG. 4 will be compared below.

Figure 5A:
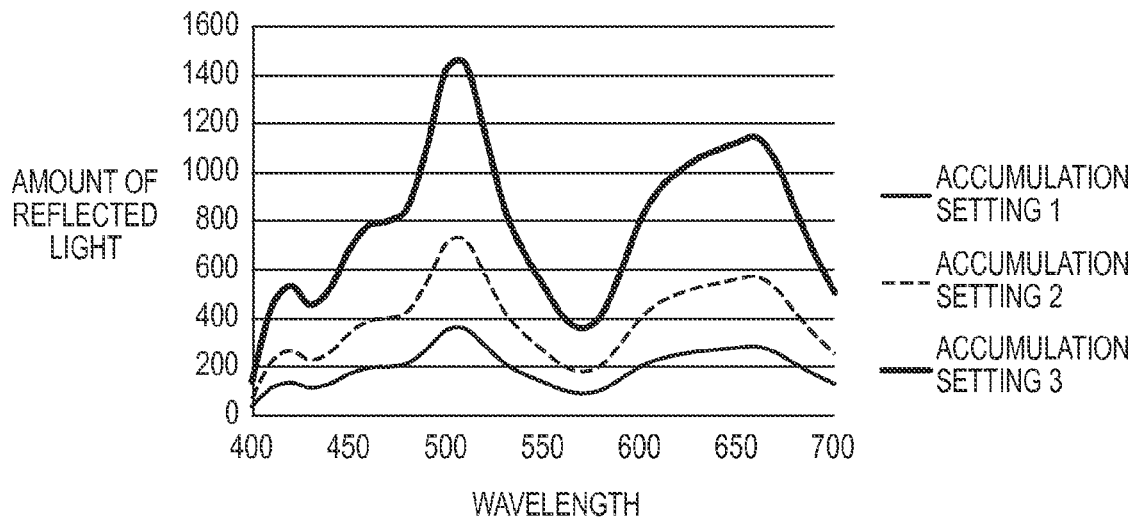
FIGS. 5A and 5B are diagrams showing an amount of reflected light with respect to wavelength and accumulation time.
Figure 5B:
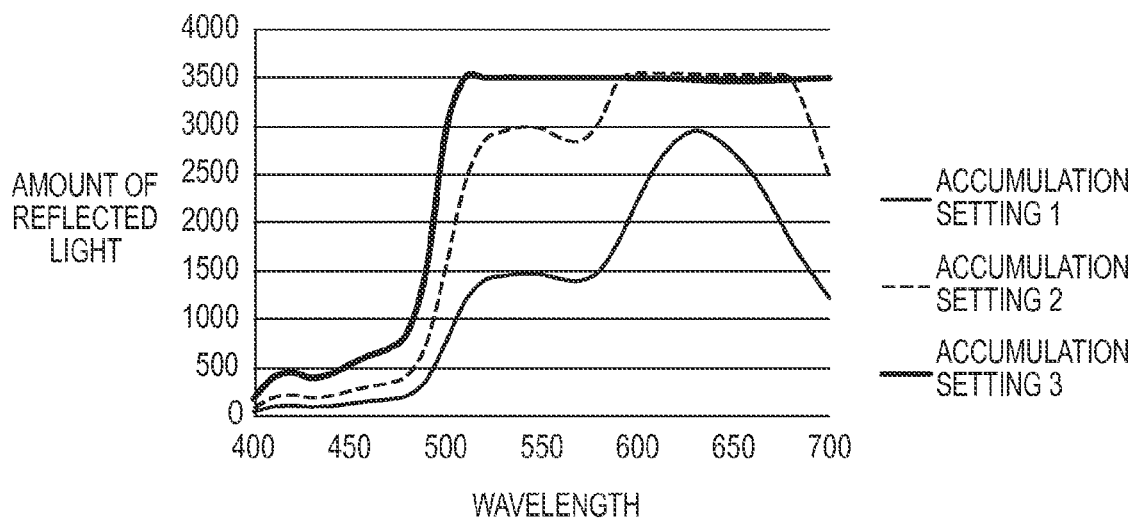

FIGS. 5A and 5B are diagrams showing the relationship between accumulation time differences and the amount of reflected light. The horizontal axis indicates the wavelength and the vertical axis indicates the amount of reflected light. In particular, FIG. 5A shows the relationship between the accumulation time and the amount of reflected light with respect to a test pattern whose pattern number is number 81, which is a representative example of a dark portion test pattern. FIG. 5B shows the relationship between the accumulation time and the amount of reflected light with respect to a test pattern whose pattern number is number 13, which is a representative example of a light portion test pattern. Note that FIGS. 5A and 5B show the amount of reflected light with respect to the three accumulation settings. The amount of reflected light here is obtained by subtracting a dark output value from the amount of light that is reflected from the test pattern and is incident on the color sensor 200. The dark output value refers to an output value from the color sensor 200 obtained when the light source of the color sensor 200 does not emit light. As shown in FIG. 5A, it is clear that the amount of reflected light increases as the exposure time increases for the dark portion test pattern number 81. In general, if there is a small amount of reflected light, the percentage of the noise component with respect to the electrical signal is large. Accordingly, it can be said that the accumulation setting 3 by which a large dynamic range can be obtained is appropriate for the dark portion test pattern number 81.

On the other hand, it can be determined that the accumulation setting 1 is appropriate for the light portion test pattern number 13. It should be noted that if the wavelength is 600 nm or above in the accumulation setting 2, the amount of reflected light will be saturated. If the wavelength is 500 nm or above in the accumulation setting 3, the amount of reflected light will be saturated. This is caused by the amount of reflected light plateauing at around 3500 due to the fact that the signal value indicating the amount of reflected light is limited to 4096, and the fact that the dark output value is 596. Thus, there is an appropriate accumulation time for each of the 81 test patterns that are to be used for multicolor correction.

Averaging Process Execution Count

The averaging process execution count N is the number of times that color measurement needs to be performed (number of times sampling is performed) in order to average out irregularities in microscopic regions in the test patterns. By setting an appropriate averaging process execution count, color measurement accuracy is improved. In the present embodiment, there are three levels of settings for the averaging process execution count N (e.g., 4 times, 8 times, 16 times), and the appropriate value is selected for each test pattern. The averaging process execution count N that is appropriate for each test pattern is determined in advance at the time of factory shipping and stored in the memory 205.

FIG. 6 shows the relationship between the averaging process execution count N for CMYKWRGB test patterns and a color difference $\Delta E$. CMYKWRGB indicates cyan, magenta, yellow, black, white, red, green, and blue. The vertical axis indicate the color difference $\Delta E$ between a value obtained by measuring a CMYKWRGB test pattern in a resting state and a value obtained by measuring the color of the test pattern while the test chart on which the test pattern is recorded is conveyed. The horizontal axis is the averaging process execution count N. This is the number of measured values (can also be referred to as the number of times measurement is performed and the number of times sampling is performed) that are obtained by measuring the color of a test pattern while the test chart is conveyed and that are used when the average value of test pattern measurement values is to be calculated. Note that color difference data in the case where the averaging process execution count is 2 is shown in FIG. 6 for comparison. It is clear from looking at FIG. 6 that as the averaging process execution count N is increased, the color difference $\Delta E$ with respect to still scanning decreases. In other words, it is clear that as the averaging process execution count N is increased, the accuracy of color measurement increases.

As shown in FIG. 7, in the present embodiment, the appropriate averaging process execution count for each of the 81 test patterns is set at 16 times. Furthermore, FIG. 7 also shows a pattern size obtained by substituting the accumulation time t, the averaging process execution count N, and the like shown in FIG. 7 into Equation 1.

The present embodiment aims to reduce the size of the test patterns and reduce the number of sheets and the amount of color material that is consumed. As described above, the reflected light from the test patterns is accumulated by the light receiving elements of the color sensor 200 for the accumulation times that are determined for the respective test patterns. If the sizes of the test patterns are designed using the longest accumulation time (accumulation time 3) as a reference, the sizes of the test patterns tend to be needlessly large. In view of this, as shown in Equation 1, the test pattern generation unit 143 need only determine the lengths of the test patterns in the conveyance direction of the test chart according to the lengths of the accumulation times for the respective test patterns. Accordingly, the sizes of the test patterns are set to appropriate lengths, and the number of sheets that constitute the test chart can be reduced. Additionally, since the sizes of the test patterns are set to appropriate lengths, the amount of color materials that is consumed is also reduced.

Advantages of the present embodiment will be described here using a comparative example. The sizes of the test patterns in the comparative example are all sizes obtained based on the longest accumulation time (accumulation time 3). That is to say, all of the test pattern sizes are the largest size.

The setting values of the test patterns in the present embodiment are as shown in FIG. 4. The number of test patterns for each accumulation setting is as follows.

Accumulation setting 1, averaging process execution count of 16 times (pattern type A): 34 test patterns.

Accumulation setting 2, averaging process execution count of 16 times (pattern type B): 29 test patterns.

Accumulation setting 3, averaging process execution count of 16 times (pattern type C): 18 test patterns.

The total length when the 81 test patterns are aligned in one line in the conveyance direction is as follows.

Total length in Embodiment 1
=12*34+24*29+48*18
=2424 (mm)

On the other hand, the test pattern size in the comparative example is 48 mm based on Equation 1. In other words, the size of all the test patterns is 48 mm in the comparative example.

Total length of patterns in comparative example
=48*81
=3888 (mm)

Accordingly, with Embodiment 1, the necessary size of regions can be reduced by about 35% compared to the comparative example. Next, consideration will be given to how many A3 sheets are needed in the case where the test chart is created on A3 sheets. The total length in the conveyance direction of an A3 sheet is 420 mm, but it is not the case that the test patterns can be aligned on the entirety of it. For example, the vicinity of the leading edge in the conveyance direction vibrates and the influence of the vibration provides a deviation in the measurement result. The margin for preventing the effect of the vibration is, for example, 30 mm. In other words, test patterns are not arranged in the region extending 30 mm from the leading edge in the conveyance direction of the A3 sheet. Accordingly, the length of the region in which the test patterns can be formed on the A3 sheet is 390 mm. When the test patterns of Embodiment 1 are to be formed on the A3 sheets, seven A3 sheets are needed in total. On the other hand, in the case of the comparative example, ten A3 sheets are needed. Accordingly, in the present embodiment, it is possible to reduce the number of A3 sheets by three sheets compared to the comparative example.

As described above, in the present embodiment, the lengths of the test patterns in the conveyance direction of the test chart correspond to the lengths of the accumulation times for the respective test patterns. Accordingly, the pattern size can be reduced more than with the conventional technology since the size of needless regions that are not read by the color sensor can be reduced. As a result, the number of sheets and the amount of consumed color materials can be reduced. Note that a method for reducing the number of test patterns is conceivable as the method for reducing the number of sheets and the amount of color materials consumed. However, if the number of test patterns is reduced, the amount of data needed for maximum density correction, tone correction, and color matching profile creation will not be satisfied, and the accuracy in the adjustment of the image forming apparatus will decrease. On the other hand, since it is not the case that the number of test patterns is reduced with the present invention, it is possible to maintain high accuracy with regard to the adjustment (calibration quality d) of the image forming apparatus.

According to the present embodiment, the test pattern generation unit 143 determines the length of each test pattern based on the accumulation time for that test pattern and the conveyance speed of the test chart. The accumulation time for obtaining an appropriate dynamic range without saturation occurring is different for each test pattern. Also, the speed at which each test pattern passes the color sensor 200 is equal to the conveyance speed of the test chart. Accordingly, the length of each test pattern is proportional to the accumulation time and the conveyance speed. Note that the test pattern generation unit 143 may calculate the length of each test pattern furthermore based on the number of times sampling is performed for that test pattern.

Although the influence of density irregularities and the like can be mitigated by sampling the test pattern multiple times, it is necessary to commensurately increase the length of the test pattern in order to execute sampling multiple times.

Modified Example of Embodiment 1

In Embodiment 1, a description was given using one color sensor 200 for measuring the test patterns. Of course, it is possible to use two or more color sensors 200. In such a case, the multiple color sensors 200 are aligned in a direction orthogonal to the conveyance direction of the test chart, for example. One color sensor 200 can scan only one column of test patterns formed on one sheet, but multiple columns of test patterns can be scanned at the same time if multiple color sensors 200 are used. Note that the color sensors 200 can be arranged in any manner as long as it is an arrangement in which multiple columns of test patterns can be scanned.

A description will be given here in which the colors of test patterns are measured by four color sensors 200 as an example, but it is sufficient that two or more color sensors 200 are used. Note that in the case of measuring color using the multiple color sensors 200 as well, the necessary number and size of the test patterns are the same as those in Embodiment 1.

An example is shown below regarding the layout of the test patterns. Note that the layout described below is an example and the layout of the present invention is not meant to be limited to this alone. This is because it is sufficient that the number of sheets constituting the test chart can be reduced overall.

Figure 8:
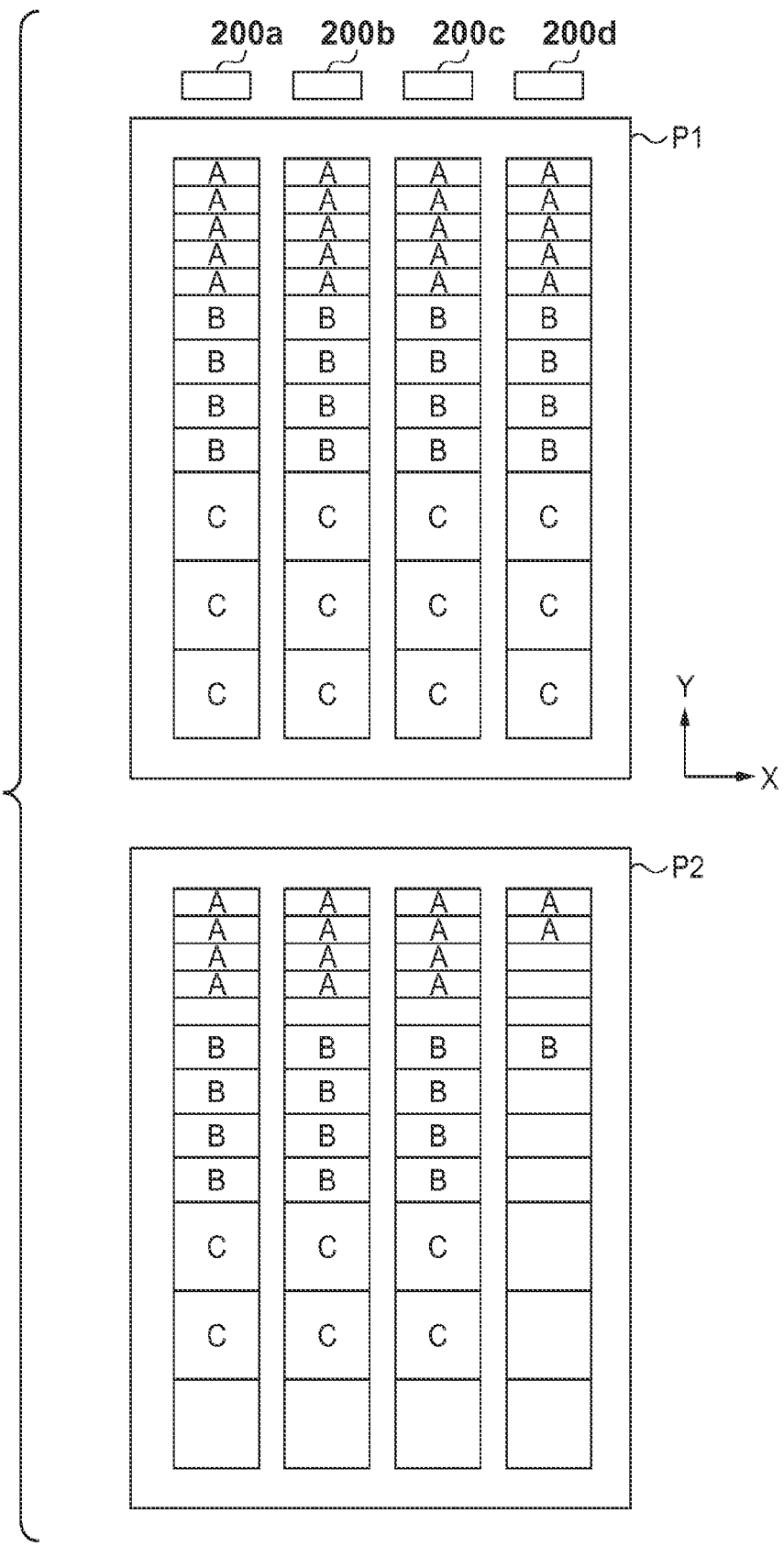
FIG. 8 is a diagram showing an example of a test pattern layout.
Figure 9:
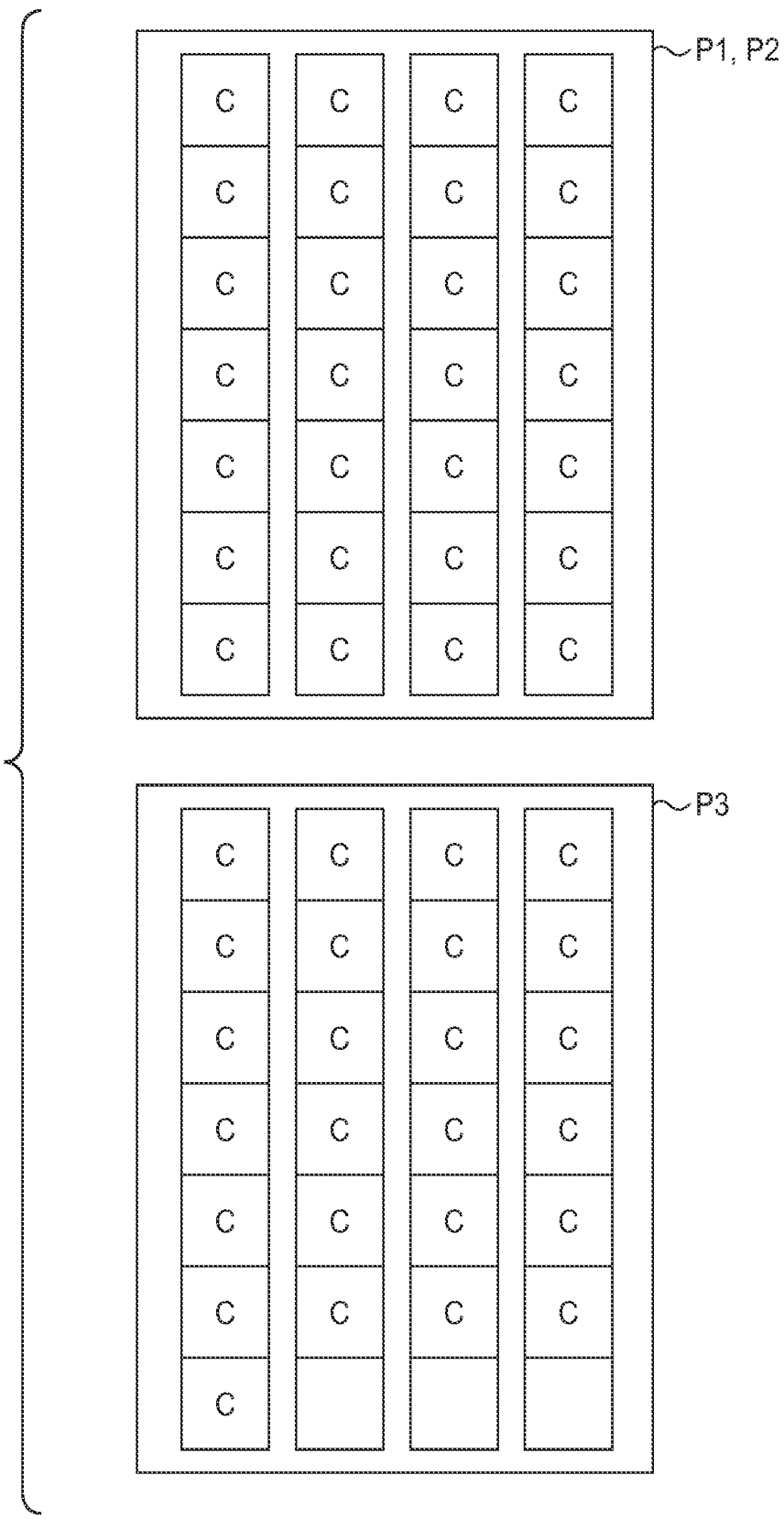
FIG. 9 is a diagram showing an example of a test pattern layout.

FIG. 8 shows a first-page test chart P1, a second-page test chart P2, and four color sensors 200*a*, 200*b*, 200*c*, and 200*d*. The conveyance direction of the test charts P1 and P2 in FIG. 8 is the Y direction. The downward direction orthogonal to the Y direction is the X direction. The four color sensors 200*a*, 200*b*, 200*c*, and 200*d* are aligned in the X direction. The number of needed A3 sheets can be reduced by two sheets by arranging the test patterns as shown in FIG. 8. Note that no test patterns are arranged in a portion of the areas in the test chart P2. More test patterns may be furthermore arranged in the blank areas in order to effectively utilize the blank areas. In this way, by increasing the number of test patterns, it is possible to accurately execute the adjustment (calibration) of the image forming apparatus that is executed based on the result of measuring the color of the test patterns. On the other hand, consideration will be given to a comparative example in which all of the test patterns are created using the longest accumulation time as a reference. In other words, the size of all the test patterns in the comparative example is 48 mm (pattern type C). As shown in FIG. 9, three A3 sheets, namely the test charts P1, P2, and P3 are needed in the comparative example.

As described above, in the modified example, by furthermore combining multiple color sensors 200 with the technical idea of Embodiment 1, the number of sheets and the amount of color material consumed can be reduced. Other effects are the same as in the description relating to Embodiment 1.

The state of the image forming engine changes as the number of image forming sheets increases (as the number of days that have elapsed since the time of factory shipping increases). For example, sometimes the density of images formed by the image forming apparatus 100 decreases or increases with respect to the envisioned density (the predefined density that is determined at the time of factory shipping) due to the change in the state of the image forming engine. For example, saturation in the color sensor 200 tends to occur since the amount of reflected light increases when the density is lower than the predefined density. This saturation is resolved by dynamically shortening the accumulation time. On the other hand, the dynamic range needs to be maintained by lengthening the accumulation time since the amount of reflected light decreases when the density is greater than the predefined density. However, in Embodiment 1, the test pattern size is adjusted in accordance with the accumulation setting that was defined in advance based on the image signal. Accordingly, if the accumulation time is lengthened, there is a risk of scanning a test pattern arranged subsequently to the target test pattern in the conveyance direction. If a color matching profile and the like are created using the result of scanning another test pattern in this way, the color stability decreases. In view of this, in Embodiment 2, the size of test patterns whose accumulation setting tends to change to the accumulation setting of the next level due to a state change in the image forming engine is determined in advance in accordance with the next accumulation setting. Accordingly, even if the accumulation time is changed dynamically, a separate test pattern is not likely to be scanned, and it is easy to maintain accuracy in the calibration.

In Embodiment 2, accumulation times obtained at the time of factory shipping (basic accumulation times) are stored in the memory (accumulation setting storage unit 172) and the accumulation times are changed according to state changes in the image forming engine. Note that the accumulation time is defined according to the usage amount of multiple color materials (the sum of YMCK image signal values or the like). Thus, the accumulation time of each of the test patterns stored in the accumulation setting storage unit 172 is the basic accumulation time that was determined in advance according to the usage amounts of the multiple color materials for forming that test pattern. Note that the size of the test pattern is determined based on the basic accumulation time. In the present embodiment, pre-scanning is executed before main scanning for detecting the color and density of the test patterns. Pre-scanning is a measurement process for determining the accumulation time that is to be used for main scanning.

In order to describe pre-scanning, pre-scanning that is executed in a multicolor CAL will be described here. However, pre-scanning and main scanning in the present invention can be applied as pre-scanning and main scanning in maximum density correction and tone correction. This is because pre-scanning is for setting the accumulation time of the color sensor 200 for each test pattern, and is not dependent on how the scanning result of the color sensor 200 is to be used. The color measurement speed (conveyance speed), test pattern size, and sensor settings that will be described below are merely examples for facilitating understanding of the description.

Necessity of Pre-Scanning

Pre-scanning is a task of determining a color measurement condition of the color sensor 200 in a color measurement step (main scanning) for performing multicolor CAL. The color measurement condition mentioned here is the accumulation setting (accumulation time) of the color sensor 200. The color measurement condition is a condition needed for accurately measuring the color of a test pattern. In summary, the accumulation time t is the amount of time for measurement for which the amount of reflected light that is incident on the color sensor 200 from the test patterns is appropriate.

Embodiment 1 described that due to color being measured using appropriate accumulation settings with respect to a color correction test chart formed according to input signal values such as those shown in FIG. 4, saturation and insufficient dynamic range are less likely to occur. This is because the accumulation time of each test pattern depends on the amount of reflected light from the test pattern. However, as the state of the image forming engine changes, the appropriate accumulation setting for each test pattern changes as well. For example, the appropriate accumulation time sometimes changes from accumulation setting 2 to accumulation setting 1. If the color sensor 200 performs color measurement using the accumulation setting 2 that is set as the default in such a case, there is too much incident light on the color sensor 200 and saturation occurs. In this case, accurate color measurement cannot be performed. On the other hand, sometimes the appropriate accumulation time changes from accumulation setting 1 to accumulation setting 2, or from accumulation setting 2 to accumulation setting 3. This means that the density of the test pattern changes in the direction of increasing. If a test pattern is scanned using the original accumulation setting in this case, the dynamic range is insufficient and susceptible to noise. Changes in the color measurement accuracy will be described here using test pattern number 13 and test pattern number 81 shown in FIG. 4 as examples with respect to the case where color is measured using an appropriate accumulation setting and the case where it is not.

Figure 10A:
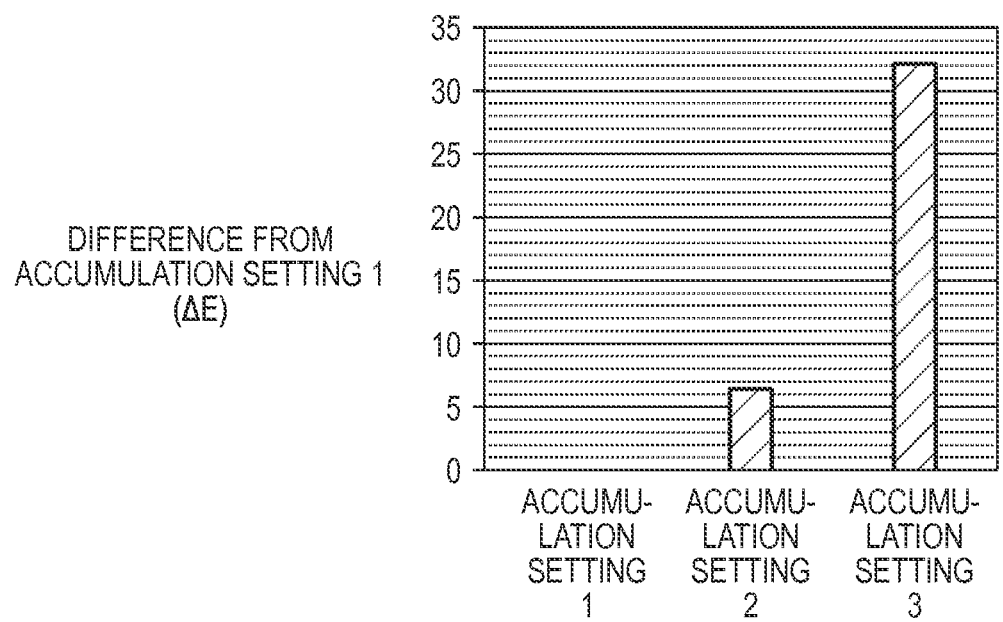
FIGS. 10A and 10B are diagrams showing color differences according to differences in accumulation settings.

FIG. 10A shows the relationship between the accumulation time and the color difference ΔE with respect to the test pattern number 13 (dark portion pattern) whose appropriate accumulation time is accumulation setting 1. The test pattern number 13 undergoes color measurement using the accumulation settings 1, 2, and 3. The color difference ΔE is the difference between the result of color measurement using the appropriate accumulation setting 1 and the result of color measurement using the accumulation setting 1, 2, or 3. It is clear from looking at FIG. 10A that ΔE is 6.6 using the accumulation setting 2, and ΔE is 32.3 using the accumulation setting 3. This shows that the color measurement result differs significantly from the ideal result. As described above, if saturation occurs in the output values of the color sensor 200, an accurate color cannot be detected. Accordingly, significant error appears. If the accumulation setting for the light portion pattern differs from the appropriate accumulation setting by even one level in this way, saturation sometimes occurs. Note that in order to prevent the occurrence of saturation, the accumulation time need only be shortened, and it is not necessary to reduce the size of the test pattern.

Figure 10B:
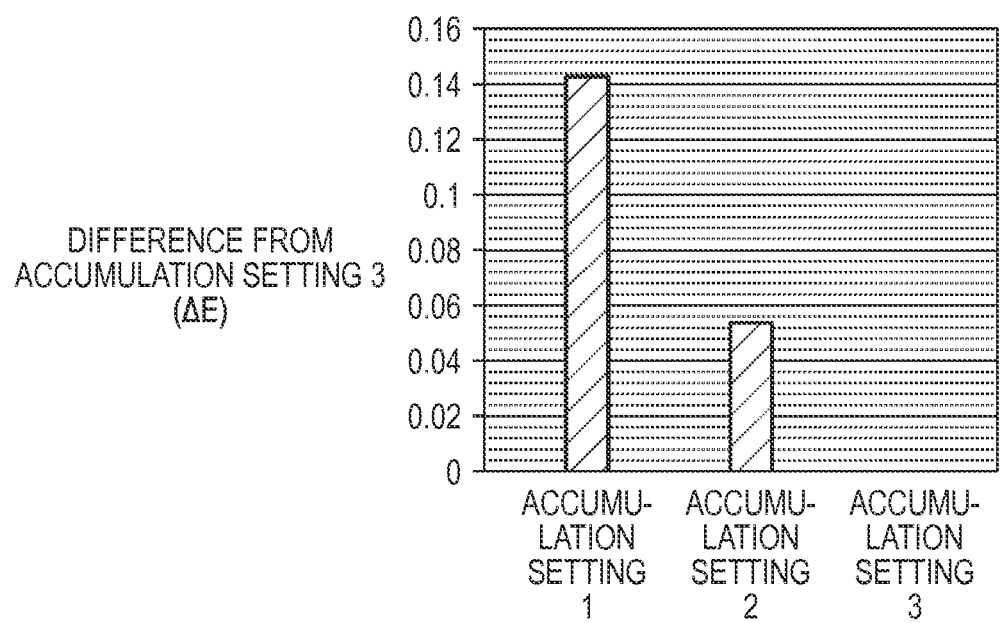

FIG. 10B shows the relationship between the accumulation time and the color difference LE with respect to the test pattern number 81 (light portion pattern) whose appropriate accumulation time is accumulation setting 3. It is clear from looking at FIG. 10B that ΔE is 0.06 using accumulation setting 2, and ΔE is around 0.14 using accumulation setting 1. This means that although saturation has not occurred, noise has an influence since the amount of reflected light is too small. Even if the accumulation setting for the dark portion pattern differs by one level, ΔE is less than 0.1. In other words, no significant decrease in accuracy is observed. On the other hand, if the accumulation setting differs by two levels, ΔE exceeds 0.1. This means that there is a risk that the detection accuracy of the color sensor 200 that is needed for color matching and color stability will not be obtained. Accordingly, the accumulation time needs to be dynamically increased.

Accordingly, it is important that the accumulation time that is to be used by the color sensor 200 in main scanning is adjusted dynamically based on the pre-scanning result. Note that in main scanning, it is necessary to adjust the accumulation time in accordance with rules such as the following.

[i] The color sensor 200 is not to cause saturation to occur

[ii] The difference from the basic accumulation setting at the time of factory shipping is not to be two levels or more, even when using an accumulation setting at which saturation does not occur (in other words, a change of one level is permitted)

Pre-Scanning and Main Scanning

Figure 11:
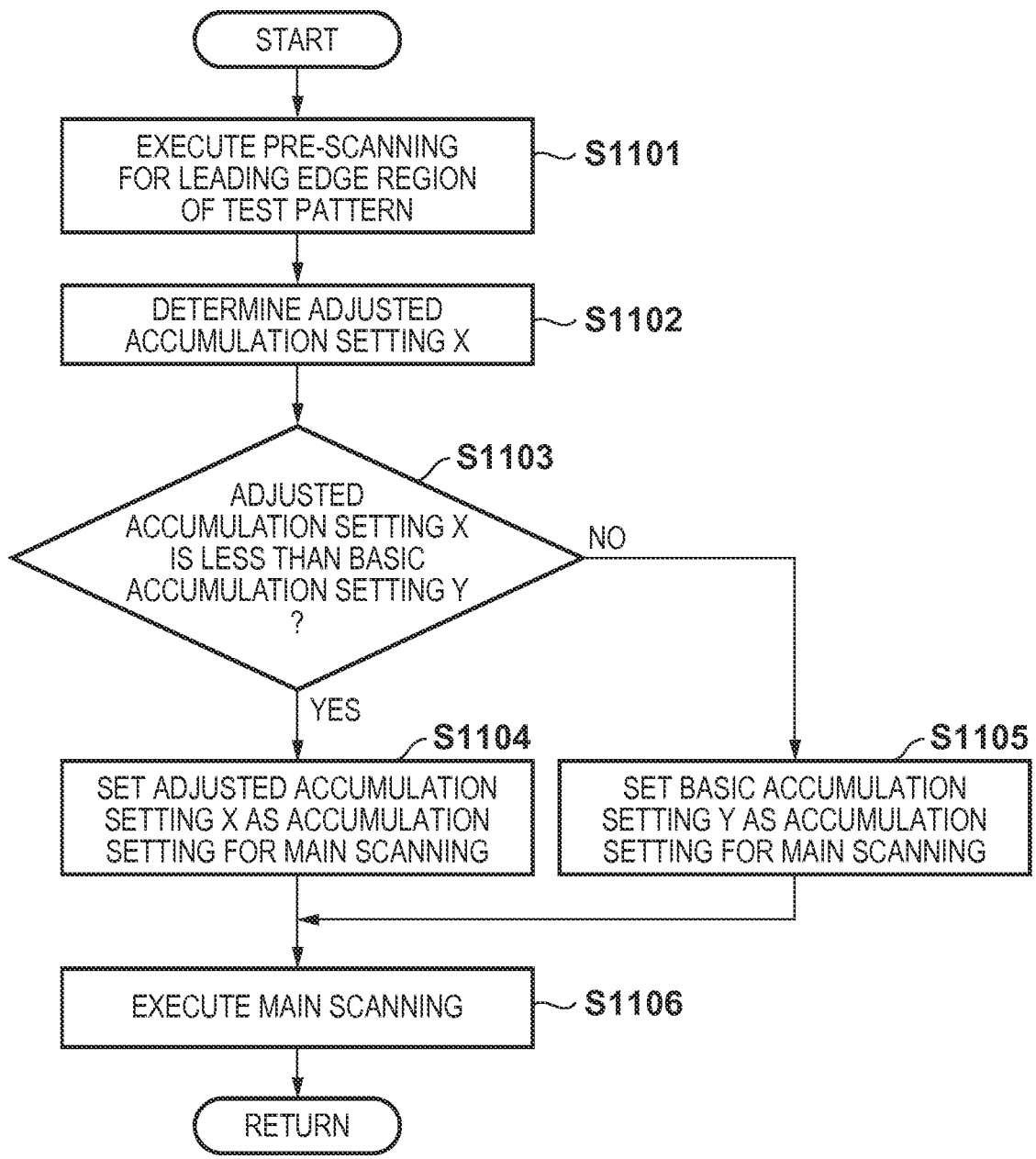
FIG. 11 is a flowchart showing steps for pre-scanning and main scanning.

Pre-scanning and main scanning will be described next with reference to FIGS. 11 and 12. The steps shown in FIG. 11 are basically processes executed by the printer controller CPU 313 or processes executed under control thereof. Also, the steps are executed for each test pattern.

The printer controller CPU 313 instructs the engine control unit 102 of the printer unit 1201 to form a test pattern on a sheet. The engine control unit 102 instructs the test pattern generation unit 143 to output test pattern image data. The test pattern generation unit 143 determines the size S of each test pattern by reading out the accumulation time t, the averaging process execution count N, and the conveyance speed PS from the table held in the memory such as the accumulation setting storage unit 172 and outputs the image signal of each test pattern. Note that the accumulation time held in the table will be referred to as the basic accumulation setting (basic accumulation time). The basic accumulation time is determined in advance at the time of factory shipping. The image signal is input to the exposure unit of the stations and a latent image is formed. The latent image is developed into a toner image, is transferred to a sheet, and undergoes a fixing process.

Figure 12:
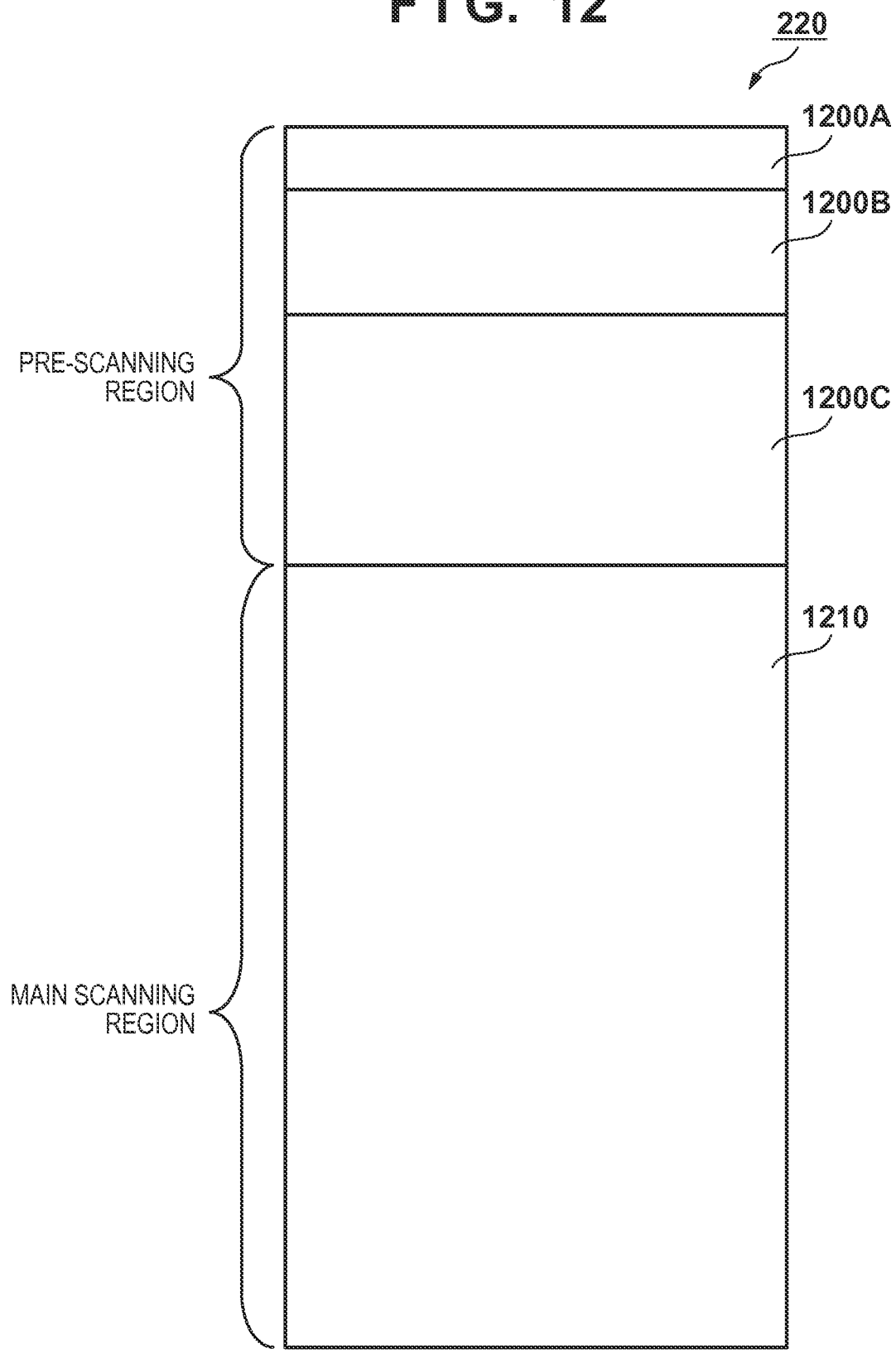
FIG. 12 is a diagram showing an example of a pre-scanning region and a main scanning region in a test pattern.

FIG. 12 shows an example of a test pattern. In FIG. 12, for the sake of convenience in the description, the test pattern 220 is divided into pre-scanning regions 1200A, 1200B, and 1200C, and a main scanning region 1210, but in actuality it is a toner image having a uniform density. The first pre-scanning region 1200A is a region measured according to the accumulation setting 1. The second pre-scanning region 1200B is a region measured according to the accumulation setting 2. The third pre-scanning region 1200C is a region measured according to the accumulation setting 3. Note that this alignment order may be changed.

In step S1101, the printer controller CPU 313 instructs the sensor control unit 1123 to perform pre-scanning. By sequentially setting the accumulation settings 1, 2, and 3 in the color sensor 200, the sensor control unit 1123 causes the color sensor 200 to scan the three pre-scanning regions at the leading edge of the test pattern 220. The color sensor 200 accumulates scanned values in the line sensor 203 for the accumulation time corresponding to the set accumulation setting. Also, the calculation unit 204 of the color sensor 200 performs the averaging process with respect to the scanned values of the line sensor 203. The calculation unit 204 outputs the calculation result (measurement result) for the test patterns to the accumulation setting storage unit 172.

In step S1102, the printer controller CPU 313 instructs the sensor setting unit 170 to determine appropriate accumulation settings. The accumulation setting determination unit 171 of the sensor setting unit 170 compares the measurement results that correspond to the accumulation settings 1, 2, and 3 with a threshold value and identifies the accumulation setting having the highest measurement result within a range in which saturation does not occur. The accumulation settings that are determined by pre-scanning can be referred to as adjusted accumulation settings (adjusted accumulation times) that have been adjusted to reflect the state of the image forming engine.

Pre-scanning is not strictly for measuring the color of the test patterns, but rather it is scanning for checking the appropriate accumulation setting of the test patterns. Because of this, the averaging process execution count (number of times sampling is performed) in pre-scanning may be less than the averaging process execution count for main scanning. Here, the averaging process execution count for pre-scanning is one time. Note that if the appropriate accumulation setting is to be determined more accurately, the averaging process execution count may be increased to two times or more.

The following describes the pre-scanning region length that is needed when the averaging process execution count used in pre-scanning is presumed to be 1 and the conveyance speed is presumed to be 250 mm/s. Also, the accumulation times according to the accumulation settings are as follows:

Accumulation setting 1: 3 ms
Accumulation setting 2: 6 ms
Accumulation setting 3: 12 ms
Pre-scanning region
=250*(3+6+12)/1000
=5.25 (mm)

In other words, by adding 5.25 (mm) to the length of each test pattern (length of the main scanning region) described in Embodiment 1, the lengths of the test patterns in Embodiment 2 can be obtained.

In step S1103, the printer controller CPU 313 causes the accumulation setting determination unit 171 to compare the adjusted accumulation setting X obtained by pre-scanning with the basic accumulation setting Y that is registered in the table. If the adjusted accumulation setting X is less than the basic accumulation setting Y, the procedure moves to step S1104 in order to prevent saturation. In step S1104, the accumulation setting determination unit 171 sets the accumulation setting to be used for main scanning to the adjusted accumulation setting X in accordance with an instruction from the printer controller CPU 313. This will be effective for test patterns in which saturation may possibly occur with the basic accumulation setting Y. On the other hand, if the adjusted accumulation setting X is greater than or equal to the basic accumulation setting Y, the procedure moves to step S1105. In step S1105, the accumulation setting determination unit 171 sets the accumulation setting to be used for main scanning to the basic accumulation setting Y in accordance with an instruction from the printer controller CPU 313. Thus, it is possible to suppress scanning of a test pattern that is adjacent in the conveyance direction due to exceeding the main scanning region that was determined in accordance with the basic accumulation setting Y.

In step S1106, the printer controller CPU 313 instructs the sensor control unit 1123 to perform main scanning. The sensor control unit 1123 sets the accumulation setting for main scanning that is stored in the accumulation setting storage unit 172 in the color sensor 200 and causes the color sensor 200 to execute main scanning. The color sensor 200 accumulates scanned values in the line sensor 203 for the accumulation time corresponding to the set accumulation setting. Also, the calculation unit 204 of the color sensor 200 performs the averaging process with respect to the scanned values of the line sensor 203. The calculation unit 204 outputs the calculation result (measurement result) for the test patterns to the Lab calculation unit 1120, the density conversion unit 1130, and the like.

Thus, if the adjusted accumulation time X that was determined by pre-scanning is smaller than the basic accumulation time Y, main scanning is executed using the adjusted accumulation time X. Furthermore, if the adjusted accumulation time X is the same as or exceeds the basic accumulation time Y, main scanning is performed using the basic accumulation time Y. Thus, it is possible to suppress scanning of an adjacent test pattern while preventing saturation.

Basic Accumulation Setting

In Embodiment 1, an appropriate accumulation setting for each of the test patterns corresponding to input signal values was described with reference to FIG. 4. The appropriate accumulation setting is the accumulation setting in a state in which the image forming engine can output an image using a central density determined with respect to the input signal values. Accordingly, as the state of the image forming engine changes, the appropriate accumulation setting changes as well.

As described above, an innovation is needed for preventing the adjusted accumulation setting from differing by two levels or more from the basic accumulation setting used for determining the test pattern. When the density of the image formed by the image forming engine changes in the direction of decreasing, it can be handled by shortening the accumulation time. On the other hand, when the density of the image formed by the image forming engine changes in the direction of increasing, it can be handled by increasing the test pattern size in advance. Note that a long size may be determined in advance as the size for all of the multiple test patterns, but the total length of the test chart will increase significantly in such a case. Also, there are test patterns included among the multiple test patterns that are susceptible to changing from the default accumulation setting to the next accumulation setting due to variations in the state of the image forming engine. In view of this, in the present embodiment, the basic accumulation setting is set in advance to a longer accumulation setting only for test patterns whose accumulation setting is likely to transition. The appropriate accumulation setting that was determined at the time of factory shipping is set as-is as the basic accumulation setting for test patterns that are not likely to change from the default accumulation setting to the next accumulation setting. Accordingly, it is easier to suppress an increase in the total length of the multiple test patterns. Note that by thus setting the accumulation setting that is one level higher than the default accumulation setting as the basic accumulation setting for test patterns that are likely to thus change from the default accumulation setting to the next accumulation setting, it is possible to suppress shifts of two levels or more in the accumulation setting.

FIG. 13 shows an example of basic accumulation settings determined with additional consideration given to these conditions. According to FIG. 13, the number of parameters for the test patterns is as follows:

Accumulation setting 1, averaging process execution count of 16 times (pattern type A): 23 test patterns Accumulation setting 2, averaging process execution count of 16 times (pattern type B): 38 test patterns Accumulation setting 3, averaging process execution count of 16 times (pattern type C): 20 test patterns A comparison of FIG. 4 and FIG. 13 shows that the number of patterns in pattern type A has decreased from 34 to 23. Eleven test patterns (test pattern number 9 and the like) that are likely to change from accumulation setting 1 to accumulation setting 2 are included in the pattern type A test patterns shown in FIG. 4. In view of this, the basic accumulation setting for the 11 test patterns is set to accumulation setting 2, which is one level higher than it originally was. Similarly, two of the basic accumulation settings in the pattern type B test patterns shown in FIG. 4 are changed to accumulation setting 3. By determining the basic accumulation settings in this way, the accumulation setting for main scanning is adjusted to a more appropriate accumulation setting even if the image density of the image forming engine increases and the test patterns can be scanned.

Sizes of pattern types will be described next. As shown in FIG. 12, in Embodiment 2, pre-scanning is executed using the leading edge region (region scanned first by the color sensor 200) of the test pattern. The length of the region used in pre-scanning is 5.25 mm. Note that some degree of work time is needed in order to determine the result of pre-scanning and determine the accumulation time for main scanning. The test chart continues to be conveyed during the work time as well. In view of this, a margin corresponding to the work time is added to 5.25 mm and the overall region for pre-scanning is ultimately 8 mm. Specifically, the size (length in the conveyance direction) for each pattern type is as follows:

Pattern type A: 20 mm
Pattern type B: 32 mm
Pattern type C: 54 mm

Accordingly, the total length of the 81 test patterns is as follows:

Total length of region needed for patterns in Embodiment 2

=20*23+32*38+54*20
=2756 (mm)

A comparative example will be used in order to describe effects of the present embodiment. In the comparative example, all of the test patterns are created based on the longest accumulation time. The length of each test pattern is 54 mm:

Total length of regions needed for patterns in comparative example

=54*81
=4374 (mm)

Accordingly, in Embodiment 2, the sizes of test patterns can be reduced by 35% compared to the comparative example. Accordingly, the amount of toner that is consumed can be reduced as well. If the sheet is A3 size, in Embodiment 2, eight A3 sheets are sufficient, but in the comparative example, 12 A3 sheets are needed. Accordingly, in Embodiment 2, the number of sheets of recording material can be reduced as well. If the number of sheets can be reduced, the printing time for the test chart can also be reduced. Note that in Embodiment 2 as well, multiple color sensors 200 may be employed as described in the modified example of Embodiment 1. An example of forming test patterns on an A3 sheet and using four color sensors 200 will be described as an example.

Figure 14:
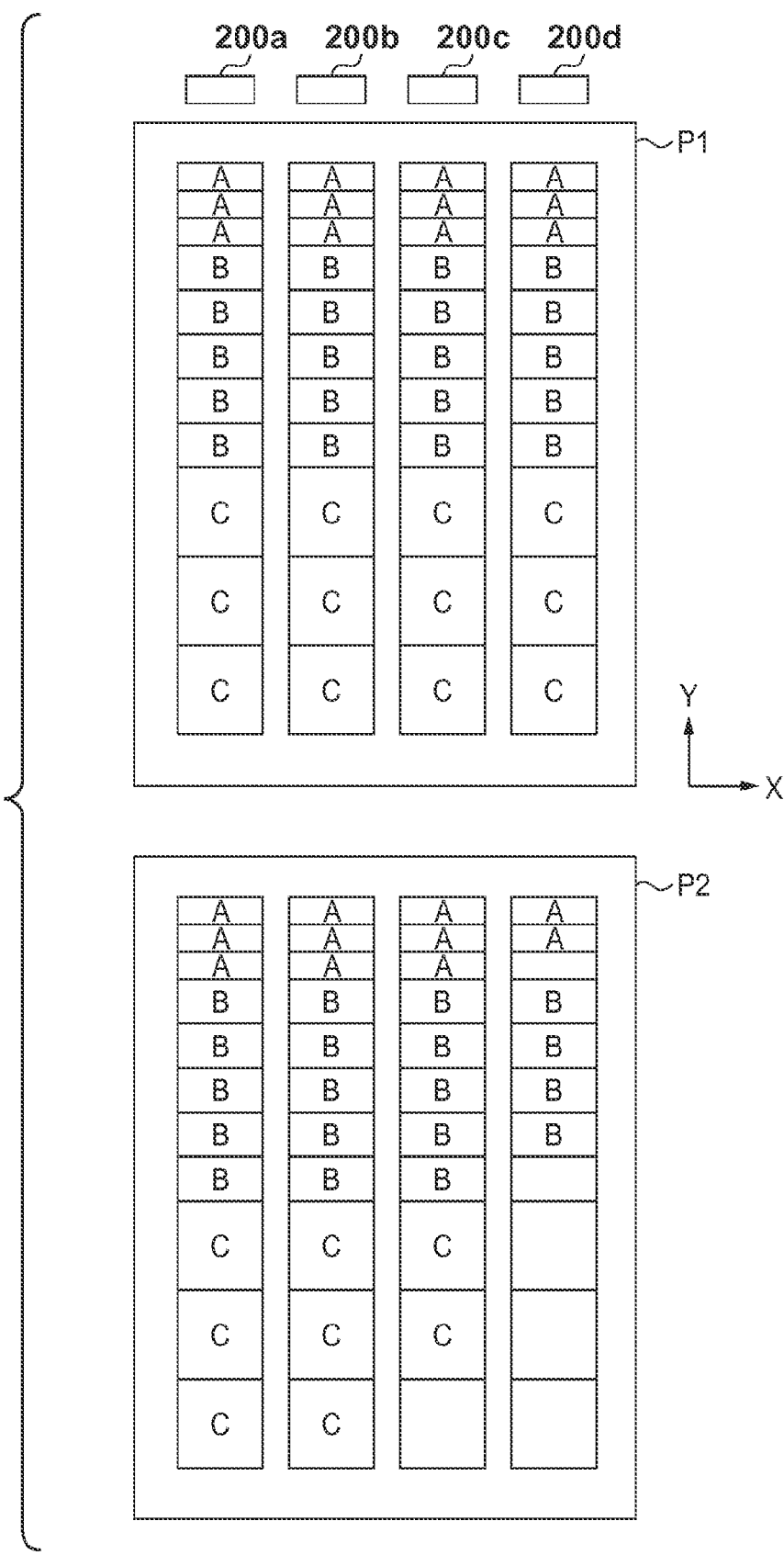
FIG. 14 is a diagram showing an example of a test pattern layout.
Figure 15:
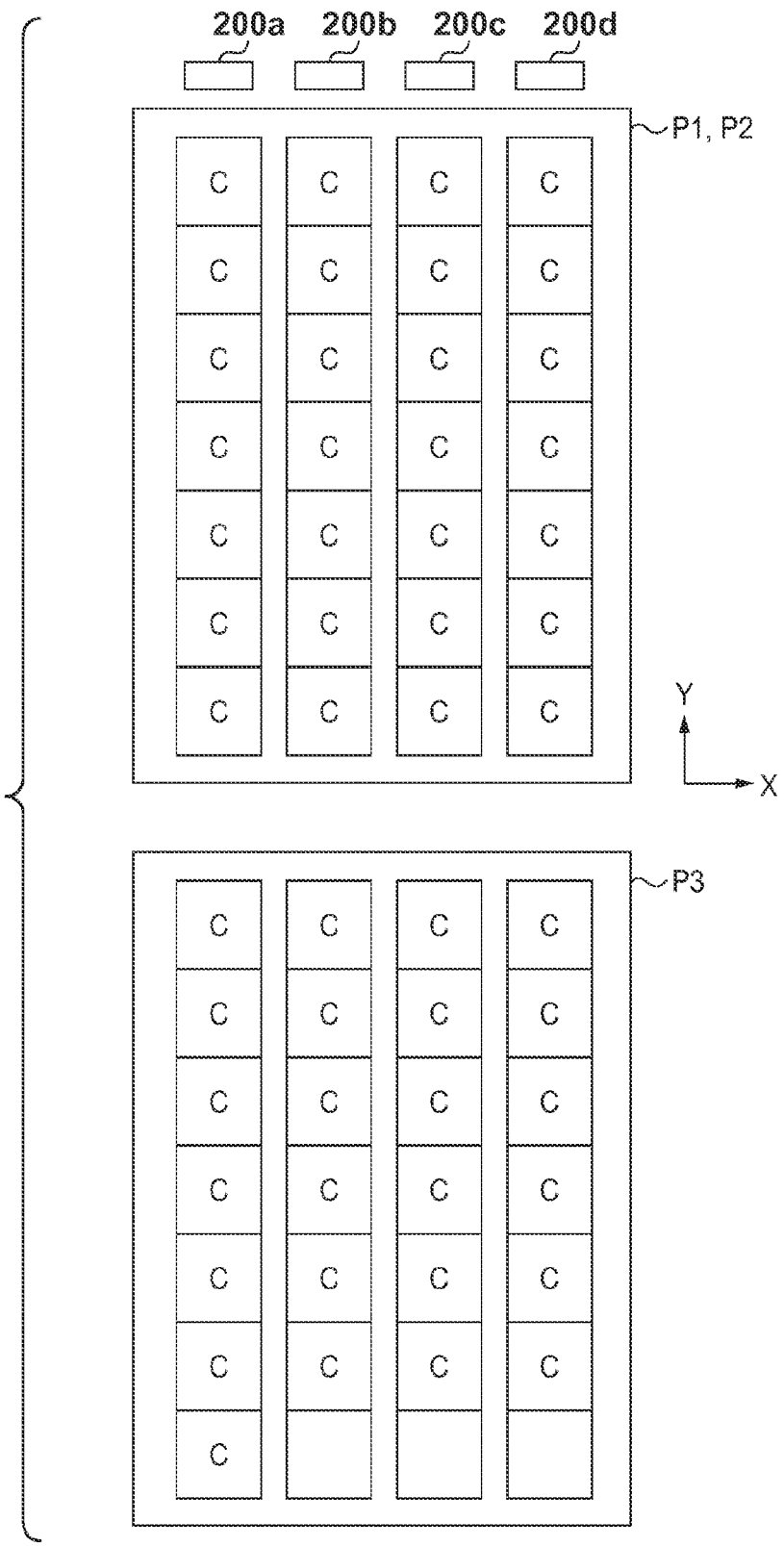
FIG. 15 is a diagram showing an example of a test pattern layout.

As shown in FIG. 14, a test chart can be formed using two A3 sheets P1 and P2 in Embodiment 2. The blank areas in FIG. 14 may be used as described in Embodiment 1. In the comparative example, three A3 sheets P1, P2, and P3 are needed as shown in FIG. 15. Accordingly, even if multiple color sensors 200 are employed, it can be said that Embodiment 2 enables reduction of the number of sheets more than the comparative example.

As described above, according to the present embodiment, the color sensor 200 executes pre-scanning on the test patterns, and executes main scanning on the test patterns using the adjusted accumulation times that were adjusted according to the result of pre-scanning. By executing prescanning and adjusting the accumulation settings for main scanning in this way, test pattern measurement can be executed accurately according to changes in the state of the image forming engine. Note that the test pattern generation unit 143 may determine the lengths of the test patterns by furthermore adding the length needed for executing pre-scanning to the size described in Embodiment 1 and generate the image signals for the test patterns. The lengths of the test patterns may be determined in advance at the time of factory shipping.

There are also test patterns included among the multiple test patterns that are susceptible to changing from the default accumulation setting to the next accumulation setting due to variation in the state of the image forming engine. In view of this, the accumulation times for several of the multiple test patterns may be accumulation times to which an amount of time has been added, the amount of time being determined under the presumption that the density of the image to be formed by image forming means will increase to a value higher than a predefined density. It is possible to envision, at the time of factory shipping, the extent to which the density of the image formed by the image forming means will change in the direction of increasing with respect to a predefined density. In other words, the extended amount of accumulation time that accompanies variations in density can be obtained in advance at the time of factory shipping as well. Alternatively, the printer controller CPU 313 or the engine state checking unit 1102 may determine the extent to which the density has increased to a value higher than the predefined density, convert the result into the amount of extension time, and add it to the basic accumulation time. By setting the basic accumulation time in this way envisioning that the image density of the image forming engine will increase, it is possible to accurately execute test pattern measurement while keeping an increase in test pattern size at a minimum.

According to the description given with reference to FIG. 11, if the adjusted accumulation time X that was determined by pre-scanning is smaller than the basic accumulation time Y, main scanning is executed using the adjusted accumulation time X. Furthermore, if the adjusted accumulation time X is the same as or exceeds the basic accumulation time Y, main scanning is performed using the basic accumulation time Y. Thus, it is possible to suppress scanning of an adjacent test pattern while preventing saturation.

In the present embodiment, the influence of variations in the sheet conveyance speed is reduced by increasing the size of a test pattern that is measured later in the sequence to a size greater than that of a test pattern that is measured earlier in the sequence. For example, among multiple test patterns, consideration will be given to a first test pattern and a second test pattern whose accumulation times in the color sensor 200 are set as equal to each other. In this case, the test pattern generation unit 143 generates image signals for multiple test patterns such that the length of the first test pattern that is arranged rearward in the conveyance direction is longer than that of the second test pattern that is arranged frontward in the conveyance direction.

Color Measurement Region and Color Measurement Margin of Pattern Size

The conveyance speed of the test chart sometimes varies due to mechanical differences in the image forming apparatus and environmental changes. Also, when the test pattern is fixed on the sheet, the sheet itself sometimes increases in length as well. These factors cause changes in the region for color measurement. For example, if no increase in the length of the sheet occurs at the conveyance speed of 250 mm/s, it is possible to accurately measure the color of the test patterns described in Embodiment 1. On the other hand, if the conveyance speed varies or the length of the sheet increases, the color measurement region and the color measurement position change. As a result, a test pattern other than the target test pattern is measured and it is difficult to accurately calculate color and density. In Embodiment 3, consideration is given to variations in the conveyance speed and the like and a margin is added to the test pattern size. Note that the sizes of test patterns in the case of not giving consideration to variations are as illustrated in FIG. 7.

The following innovation was made in the present embodiment as a method of adding a margin to the sizes of the test patterns. That is to say that even with multiple test patterns to which the same accumulation setting is applied, the margin of the test patterns arranged more rearward in the conveyance direction of the sheet is increased. This is because image position misalignment between when the conveyance speed varies and the sheet increases in length and when they do not increases closer to the trailing edge of the sheet. In other words, the amount of misalignment from the leading edge position of the sheet to the central position of the test pattern increases as the distance to the trailing edge of the sheet decreases.

Figure 16:
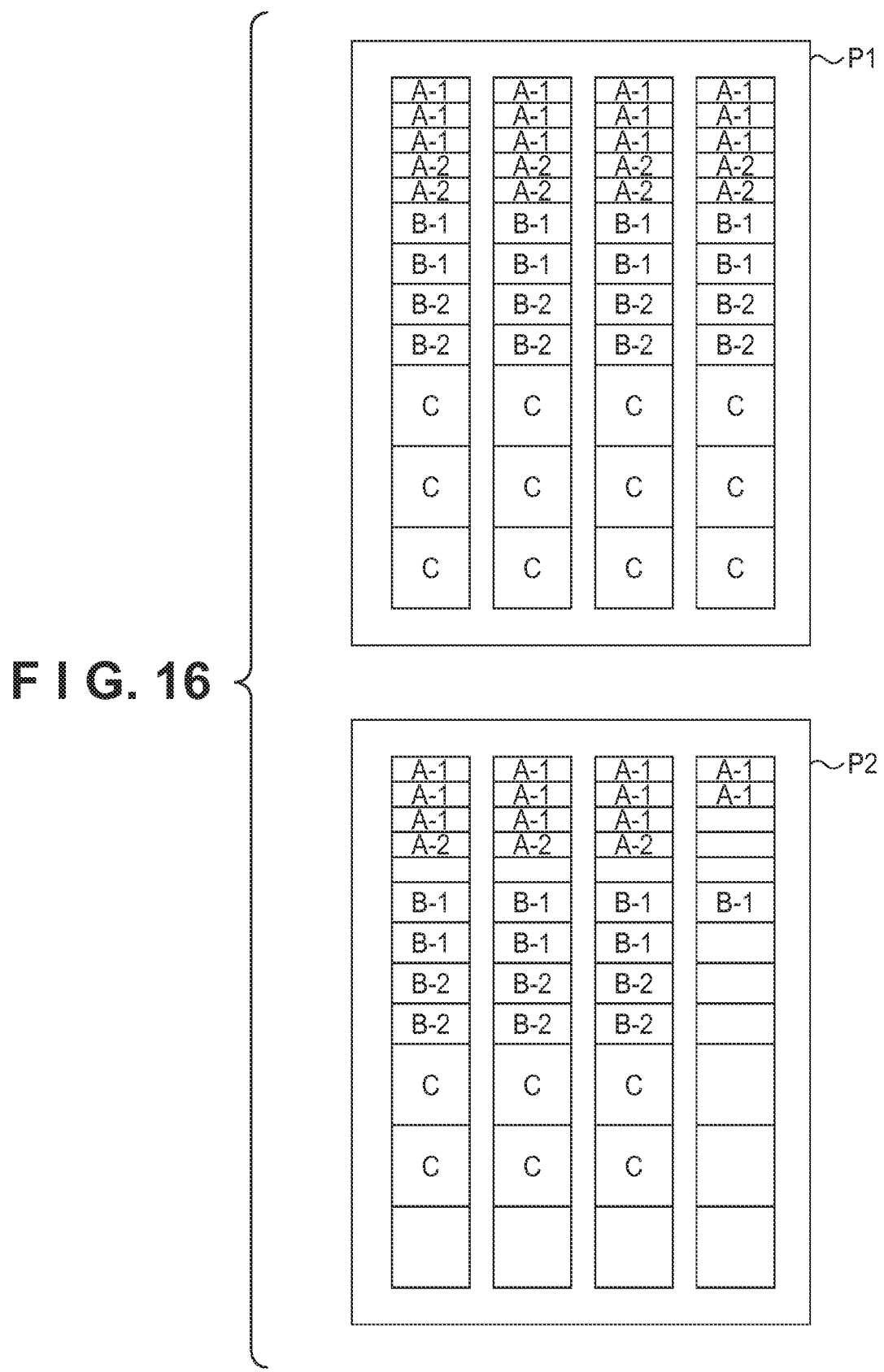
FIG. 16 is a diagram showing an example of a test pattern layout.

FIG. 16 shows the test charts P1 and P2 that are used in Embodiment 3. FIG. 16 shows test patterns that are classified by pattern types A-1, A-2, B-1, B-2, and C. FIG. 17 shows parameters for the pattern types A-1, A-2, B-1, B-2, and C. The color measurement region size in FIG. 17 is the test pattern size (length in the conveyance direction) determined based on the accumulation time, the averaging process execution count, and the conveyance speed. The pattern size is a size obtained by adding a margin to the color measurement region size.

The same accumulation setting 1 is set for both of the pattern types A-1 and A-2, but the test pattern of pattern type A-2 is arranged further rearward in the conveyance direction than the test pattern of pattern type A-1. Accordingly, the margin that is attached to the test pattern of pattern type A-2 is larger than the margin that is added to the test pattern of pattern type A-1. Similarly, the same accumulation setting 2 is set for the pattern types B-1 and B-2, but the test pattern of pattern type B-2 is arranged further rearward than the test pattern of pattern type B-1. Accordingly, the margin that is added to the test pattern of pattern type B-2 is larger than the margin that is attached to the test pattern of pattern type B-1.

As described above, the blank area shown in FIG. 16 may be used for increasing the number of test patterns, for measuring the color of the blank page area (underlying color), or the like. In Embodiment 3, the sizes of all of the test patterns categorized as pattern type C are the same size, but the sizes of the test patterns that are closer to the trailing edge may be increased similarly to pattern types A and B.

As described above, the image forming apparatus 100 forms multiple test patterns such that the length of the first measurement images (A-2, B-2) is greater than the length of the second measurement images (A-1, B-1). Here, the first measurement images (A-2, B-2) and the second measurement images (A-1, B-1) are multiple test patterns whose accumulation times in the color sensors 200 are equal. Also, the first measurement images (A-2, B-2) are arranged relatively rearward in the conveyance direction, and the second measurement images (A-1, B-1) are arranged relatively frontward in the conveyance direction. The test pattern generation unit 143 also generates image signals for these types of test patterns. In this way, by increasing the size of the test patterns that are measured later in the sequence to a size that is larger than that of the test patterns that are measured earlier in the sequence, it is possible to reduce the influence of variations in the sheet conveyance speed. Other effects of Embodiment 3 are the same as the descriptions in Embodiments 1 and 2.

While the present invention has been described with reference to embodiments, it is to be understood that the invention is not limited to the disclosed embodiments.

This application claims the benefit of Japanese Patent Application No. 2013-031427, filed Feb. 20, 2013, which is hereby incorporated by reference herein in its entirety.

What is claimed is:

1. An image forming apparatus comprising:
an image forming station configured to form an image on a sheet;
conveyance rollers configured to convey the sheet on which the image is formed;
a sensor configured to measure, based on an accumulation time, reflected light from a measurement image that is formed on a sheet conveyed by the conveyance rollers; and
a processor configured to cause execution of tasks including:
an image forming task that controls the image forming stations to form a plurality of measurement images on a sheet, wherein the plurality of measurement images includes a first measurement image and a second measurement image, and
a measurement task that controls the sensor to measure the first measurement image based on a first accumulation time, and measure the second measurement image based on a second accumulation time, wherein the second accumulation time is longer than the first accumulation time,
wherein the conveyance rollers are configured to reverse the conveyance direction of the sheet,
wherein the processor is further configured to execute the measurement task after reversal of the conveyance direction of the sheet on which the plurality of measurement images is formed, and
wherein a length of the first measurement image in a conveyance direction in which the conveyance rollers convey the sheet is shorter than a length of the second measurement image in the conveyance direction.

2. The image forming apparatus according to claim 1, wherein
the plurality of measurement images further includes a third measurement image,
the measurement task controls the sensor to measure reflected light from the third measurement image based on a third accumulation time longer than second accumulation time, and
the length of the second measurement image in the conveyance direction is shorter than a length of the third measurement image.

3. The image forming apparatus according to claim 1, wherein the processor is further configured to cause execution of tasks including:
a determination task that determines a spectral reflectivity of the measurement image based on the reflected light from the measurement image measured by the sensor.

4. The image forming apparatus according to claim 1, wherein the processor is further configured to execute tasks including:
a converting task that converts image data based on a conversion condition,
an updating task that updates the conversion condition based on a measuring result of the sensor, and
an image forming task that controls the image forming stations to form the image on the sheet based on the image data converted by the converting task.

5. The image forming apparatus according to claim 4, wherein the conversion condition is a profile for adjusting a color of an image.

6. The image forming apparatus according to claim 1, wherein the sensor includes:
a light emitter configured to emit light;
a diffracting grating configured to diffract reflected light from the measuring image; and
a line sensor configured to receive the reflected light diffracted by the diffracting grating.

7. The image forming apparatus according to claim 2, wherein the third measurement image is formed at an opposite side of the first measurement image in the conveyance direction in view of the second measurement image.

8. The image forming apparatus according to claim 1, wherein
the plurality of the measurement images further includes a third measurement image,
a length of the third measurement image in the conveyance direction is longer than the length of the first measurement image in the conveyance direction,
the length of the third measurement image in the conveyance direction is shorter than the length of the second measurement image in the conveyance direction, and
the measurement task measures the reflected light from the third measurement image based on the first accumulation time.

9. The image forming apparatus according to claim 8, wherein the third measurement image is formed between the first measurement image and the second measurement image in the conveyance direction.

10. The image forming apparatus according to claim 1, wherein
the plurality of the measurement images further includes a third measurement image,
a length of the third measurement image in the conveyance direction is longer than the length of the second measurement image in the conveyance direction, and
the measurement task measures the reflected light from the third measurement image based on the second accumulation time.

11. The image forming apparatus according to claim 1, wherein
the image forming station includes a first image forming station configured to form a first image using a cyan toner, a second image forming station configured to form a second image using a magenta toner and a third image forming station configured to form a third image using a yellow toner,
the first measurement image is formed using the cyan toner, the magenta toner and the yellow toner, and
the second measurement image is formed using the cyan toner, the magenta toner and the yellow toner.

12. An image forming apparatus comprising:
an image forming station configured to form an image on a sheet;
conveyance rollers configured to convey the sheet on which the image is formed;
a sensor configured to measure, based on an accumulation time, reflected light from a measurement image that is formed on a sheet conveyed by the conveyance rollers; and a processor configured to:
control the image forming stations to form a plurality of measurement images on a test sheet, the plurality of measurement images includes a first measurement image and a second measurement image,
control the conveyance rollers to convey the test sheet to the sensor,
execute a first scan in which the sensor measures reflected light from the plurality of measurement images, and
control the conveyance rollers to convey the test sheet to the sensor again, and configured to execute a second scan in which the sensor measures reflected light from the plurality of measurement images;
wherein the processor determines a first accumulation time for the first measurement image in the second scan based on a measurement result of the first measurement image in the first scan,
wherein the processor determines a second accumulation time for the second measurement image in the second scan based on a measurement result of the second measurement image in the first scan,
wherein the sensor measures, based on a first predetermined accumulation time, reflected light from the first measurement image in the first scan,
wherein the sensor measures, based on a second predetermined accumulation time, reflected light from the second measurement image in the first scan,
wherein the second predetermined accumulation time is longer than the first predetermined accumulation time, and
wherein a length of the first measurement image in a conveyance direction in which the conveyance rollers convey the test sheet is shorter than a length of the second measurement image in the conveyance direction.

13. The image forming apparatus according to claim 12, wherein the sensor measures, based on a plurality of predetermined times including the first predetermined time, reflected light from the first measurement image,
wherein the sensor measures, based on a plurality of predetermined times including the second predetermined time, reflected light from the second measurement image,
wherein the processor compares a measurement result of the first measurement image in the first scan and the first predetermined accumulation time, and determines the first accumulation time based on a comparison result of the measurement result of the first measurement image in the first scan and the first predetermined accumulation time, and
wherein the processor compares a measurement result of the second measurement image in the first scan and the second predetermined accumulation time, and determines the second accumulation time based on a comparison result of the measurement result of the second measurement image in the first scan and the second predetermined accumulation time.

14. The image forming apparatus according to claim 12, wherein, in a case where the measurement result of the first measurement image in the first scan is saturated, the first accumulation time is shorter than the first predetermined accumulation time, and
wherein, in a case where the measurement result of the second measurement image in the first scan is saturated, the second accumulation time is shorter than the second predetermined accumulation time.

15. The image forming apparatus according to claim 12, wherein the processor controls the conveyance rollers to reverse the conveyance direction of the test sheet, and
wherein the processor executes the second scan after reversal of the conveyance direction of the test sheet.

16. The image forming apparatus according to claim 12, wherein the processor generates information related to a color of the plurality of measurement images based on the measurement result of the plurality of the measurement images in the second scan.

17. The image forming apparatus according to claim 16, wherein the information corresponds to a spectral reflectance of each of the plurality of measurement images.

18. The image forming apparatus according to claim 12, wherein the processor generates a color profile based on the measurement result of the plurality of the measurement images in the second scan.

* * * * *